United States Patent
Takahashi et al.

(10) Patent No.: US 11,612,914 B2
(45) Date of Patent: Mar. 28, 2023

(54) CLEANING SYSTEM AND METHOD OF CONTROLLING CLEANING SYSTEM

(71) Applicant: HONDA MOTOR CO., LTD., Tokyo (JP)

(72) Inventors: Hiroya Takahashi, Wako (JP); Yoshiaki Kotani, Wako (JP); Hiroto Takahashi, Wako (JP); Naoki Kameyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 316 days.

(21) Appl. No.: 16/922,677

(22) Filed: Jul. 7, 2020

(65) Prior Publication Data
US 2021/0008603 A1   Jan. 14, 2021

(30) Foreign Application Priority Data

Jul. 12, 2019   (JP) ............................. JP2019-130524

(51) Int. Cl.
| | |
|---|---|
| *B60S 3/04* | (2006.01) |
| *B08B 3/04* | (2006.01) |
| *A01D 34/00* | (2006.01) |
| *B08B 1/00* | (2006.01) |
| *B08B 13/00* | (2006.01) |
| *A01D 34/78* | (2006.01) |
| *A01D 101/00* | (2006.01) |

(52) U.S. Cl.
CPC .............. *B08B 3/04* (2013.01); *A01D 34/008* (2013.01); *B08B 1/001* (2013.01); *B08B 13/00* (2013.01); *A01D 34/78* (2013.01); *A01D 2101/00* (2013.01)

(58) Field of Classification Search
CPC ........................................................ B60S 3/042
See application file for complete search history.

(56) References Cited

U.S. PATENT DOCUMENTS

2016/0339879 A1   11/2016   Hirata et al.

FOREIGN PATENT DOCUMENTS

| | | |
|---|---|---|
| EP | 2158802 A2 | 3/2010 |
| JP | 2016-218733 | 12/2016 |

OTHER PUBLICATIONS

European Search Report dated Dec. 15, 2020, 7 pages.

*Primary Examiner* — Jason Y Ko
(74) *Attorney, Agent, or Firm* — Rankin, Hill & Clark LLP

(57) ABSTRACT

A cleaning system includes a mower that executes a mowing work while traveling autonomously, and a cleaning station that cleans the mower. The cleaning system includes: an acquirer that acquires dirt information relating to a state of dirt of the mower; a determiner that determines at least one of a necessity of cleaning the mower and a method of cleaning the mower, based on the dirt information; and a first cleaning executor that executes a cleaning operation, according to a determination result of the determiner.

3 Claims, 10 Drawing Sheets

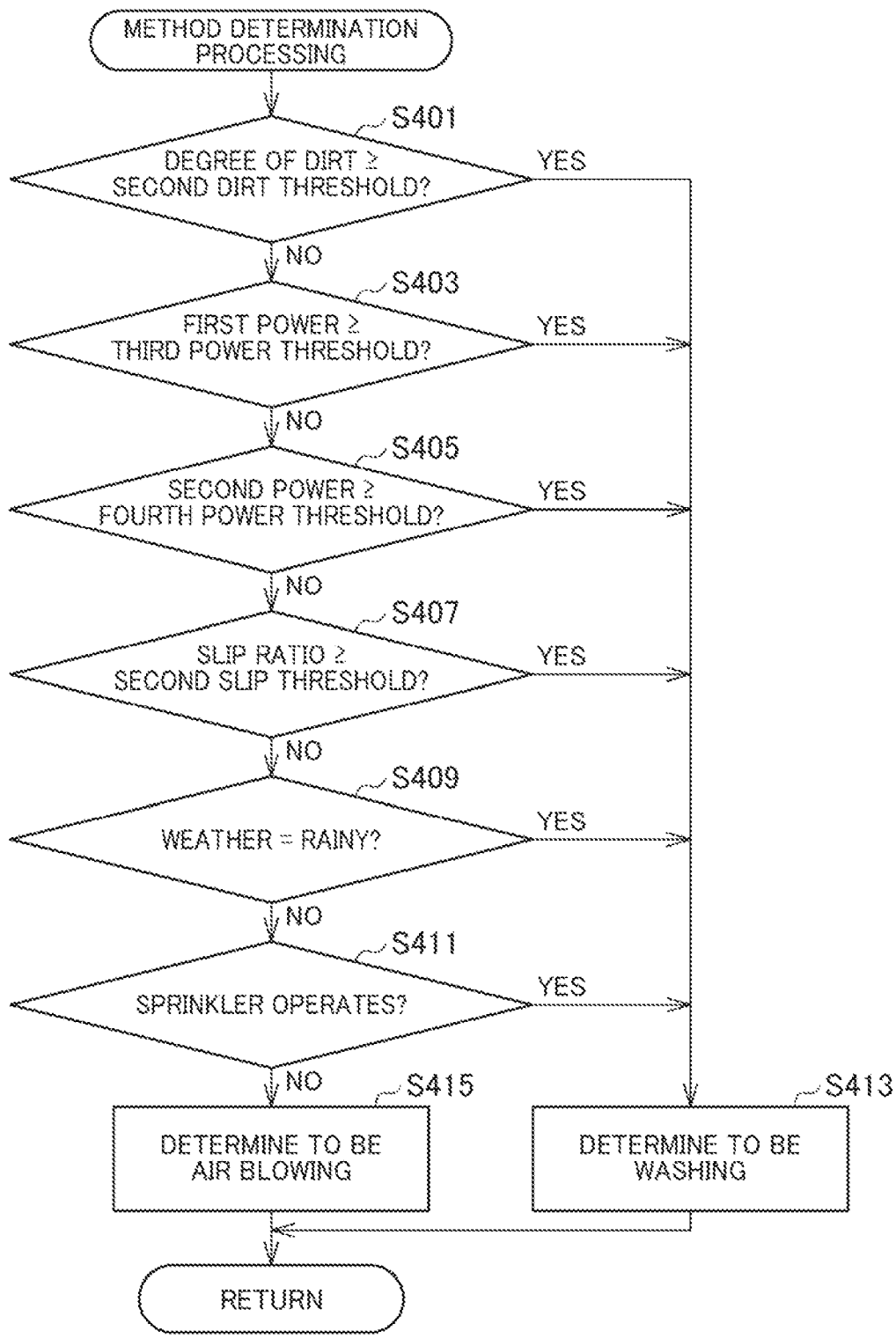

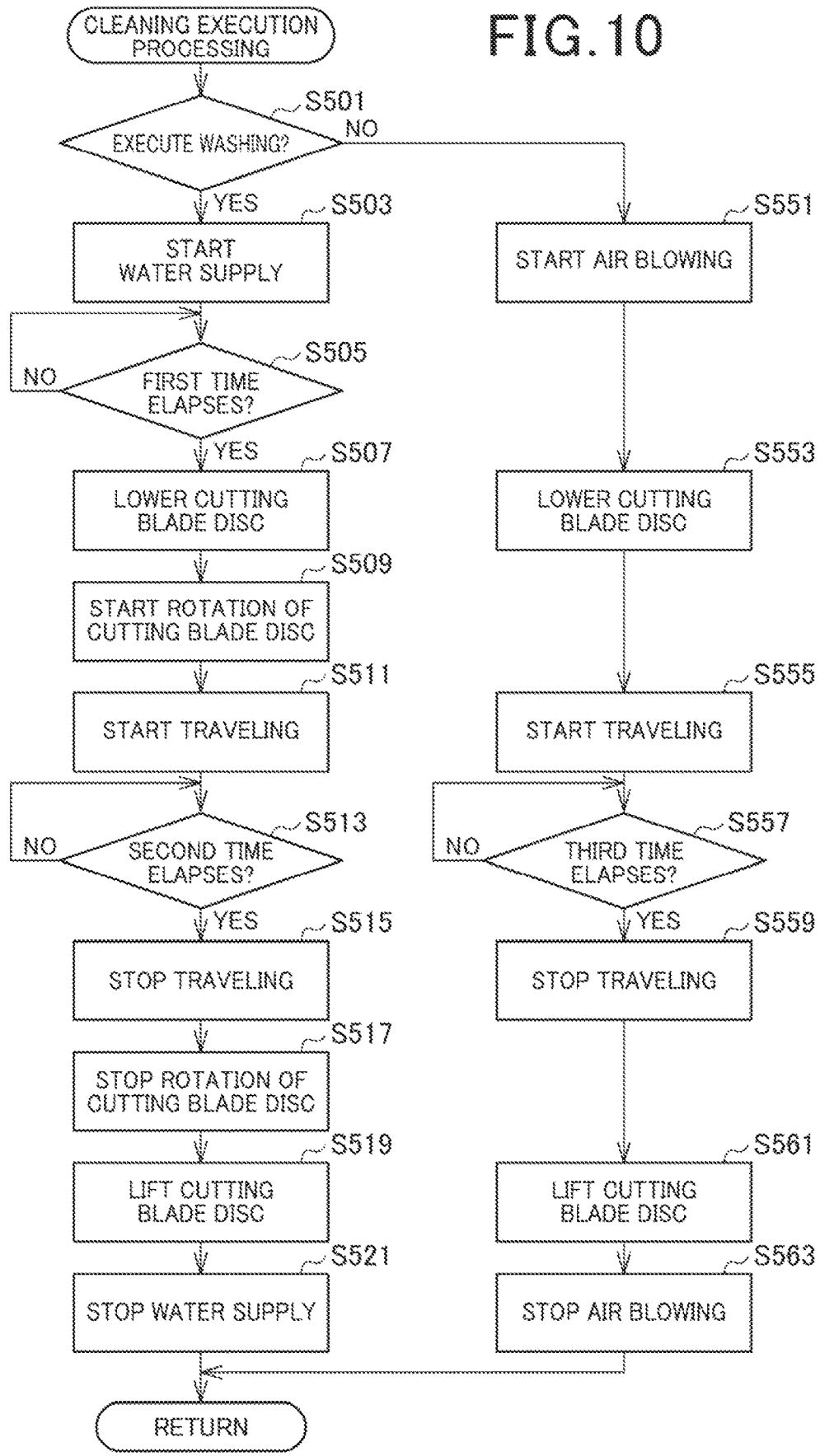

CLEANING SYSTEM AND METHOD OF CONTROLLING CLEANING SYSTEM

INCORPORATION BY REFERENCE

The present application claims priority under 35 U.S.C. § 119 to Japanese Patent Application No. 2019-130524 filed on Jul. 12, 2019. The content of the application is incorporated herein by reference in its entirety.

BACKGROUND OF THE INVENTION

Field of the Invention

The present invention relates to a cleaning system and a method of controlling a cleaning system.

Description of the Related Art

An autonomous traveling work machine has been known which works while autonomously traveling (see, for example, Japanese Patent Laid-Open No. 2016-218733).

The autonomous traveling work machine disclosed in Japanese Patent Laid-Open No. 2016-218733 includes wheels and is capable of traveling autonomously based on peripheral information. Furthermore, a cleaning area where the wheels are cleaned is equipped with a cleaning mat that cleans the wheels as the wheels turn to rub against the cleaning mat. Furthermore, the autonomous traveling work machine includes a controller that controls an operation of the autonomous traveling work machine so as to execute a cleaning process of the wheels in the cleaning area.

The autonomous traveling work machine disclosed in Japanese Patent Laid-Open No. 2016-218733 can execute the cleaning process of the wheels; however, Japanese Patent Laid-Open No. 2016-218733 does not disclose a cleaning process in a case where dirt adheres to a position other than the wheels of the autonomous traveling work machine. Furthermore, Japanese Patent Laid-Open No. 2016-218733 does not disclose that dirt that adheres to the autonomous traveling work machine is washed off with a liquid such as water.

On the other hand, as an autonomous traveling work machine, a mower has been known which executes a mowing work while traveling autonomously. In the mower, pieces of mowed grass may adhere to the periphery of a cutting blade disc that is disposed on a lower portion of a mower main body.

Furthermore, for example, when a lawn is mowed by the mower in a state where moisture adheres to a surface of the lawn after raining, pieces of the mowed grass may contain water and heavily and firmly adhere to the lower portion of the mower main body. In such a case where dirt heavily and firmly adheres to the lower portion of the mower main body, a user has used a hose or the like to apply water to the lower portion of the mower main body, washing off the dirt.

Furthermore, for example, when a lawn is mowed by the mower in a state where a surface of the lawn is dry, pieces of grass adhere to the lower portion of the mower main body more lightly and weakly than in a case where those contain water. When dirt thus weakly adheres to the lower portion of the mower main body, a user can remove the dirt by air blowing.

An aspect of the present invention has an object to provide: a cleaning system that is capable of determining at least one of a necessity of cleaning and a method of cleaning, according to a state of dirt of an autonomous traveling work machine; and a method of controlling a cleaning system.

SUMMARY OF THE INVENTION

An aspect of the present invention is a cleaning system including: an autonomous traveling work machine executing a predetermined work while traveling autonomously; and a cleaning station cleaning the autonomous traveling work machine, and the cleaning system includes: an acquirer acquiring dirt information relating to a state of dirt of the autonomous traveling work machine; a determiner determining at least one of a necessity of cleaning the autonomous traveling work machine and a method of cleaning the autonomous traveling work machine, based on the dirt information; and a cleaning executor executing a cleaning operation, according to a determination result of the determiner.

An aspect of the present invention is the above cleaning system, wherein the acquirer acquires a work history of the autonomous traveling work machine, as the dirt information, and the work history includes at least one of a work frequency, a work time, and a travel distance during work.

An aspect of the present invention is the above cleaning system including a detector detecting dirt of the autonomous traveling work machine, wherein the acquirer acquires information indicating the dirt being detected by the detector, as the dirt information.

An aspect of the present invention is the above cleaning system, wherein the detector generates a dirt image indicating the dirt of the autonomous traveling work machine, and the acquirer acquires the dirt image as the dirt information.

An aspect of the present invention is the above cleaning system, wherein at least one of the autonomous traveling work machine and the cleaning station includes an imaging unit as part of the detector, and the imaging unit generates the dirt image.

An aspect of the present invention is the above cleaning system, wherein in the autonomous traveling work machine, a work unit executing the predetermined work is driven by a first motor, and the acquirer acquires a value of at least one of a power consumption, a load voltage, and a load current of the first motor, as the dirt information.

An aspect of the present invention is the above cleaning system, wherein the autonomous traveling work machine is driven to travel by a driving wheel, the driving wheel being driven by a second motor, and the acquirer acquires a value of at least one of a power consumption, a load voltage, and a load current of the second motor, as the dirt information.

An aspect of the present invention is the above cleaning system, wherein the acquirer acquires a value of at least one of the power consumption, the load voltage, and the load current of the second motor when the autonomous traveling work machine moves to the cleaning station, as the dirt information.

An aspect of the present invention is the above cleaning system, wherein the autonomous traveling work machine is driven to travel by a driving wheel, and the acquirer acquires a slip ratio of the driving wheel, as the dirt information.

An aspect of the present invention is the above cleaning system, wherein the acquirer acquires the slip ratio when the autonomous traveling work machine moves to the cleaning station, as the dirt information.

An aspect of the present invention is the above cleaning system, wherein the acquirer acquires at least one of weather, temperature, and humidity when the autonomous traveling work machine executes the predetermined work, as the dirt information.

An aspect of the present invention is the above cleaning system, wherein when the autonomous traveling work machine executes the predetermined work, the acquirer acquires work information of a work device affecting dirt of the autonomous traveling work machine, as the dirt information.

An aspect of the present invention is the above cleaning system, wherein the autonomous traveling work machine is a mower executing a mowing work for mowing a lawn growing in a predetermined area, and the work device is a sprinkler being disposed at the predetermined area and spreading water on the lawn.

An aspect of the present invention is a method of controlling a cleaning system including: an autonomous traveling work machine executing a predetermined work while traveling autonomously; and a cleaning station cleaning the autonomous traveling work machine, and the method acquires dirt information relating to a state of dirt of the autonomous traveling work machine; determines at least one of a necessity of cleaning the autonomous traveling work machine and a method of cleaning the autonomous traveling work machine, based on the dirt information; and executes a cleaning operation, according to a result of the determination.

An aspect of the present invention can determine at least one of the necessity of cleaning and the method of cleaning, according to a state of dirt of the autonomous traveling work machine.

BRIEF DESCRIPTION OF THE DRAWINGS

FIG. 9 is a flowchart showing one example of method determination processing of the first controller; and FIG. 10 is a flowchart showing one example of cleaning execution processing of the first controller.

DETAILED DESCRIPTION OF THE PREFERRED EMBODIMENTS

Hereinafter, embodiments will be explained with reference to the drawings.

1. Configuration of Unmanned Mowing System

[1-1. Overall Configuration of Mowing System]

Figure 1:
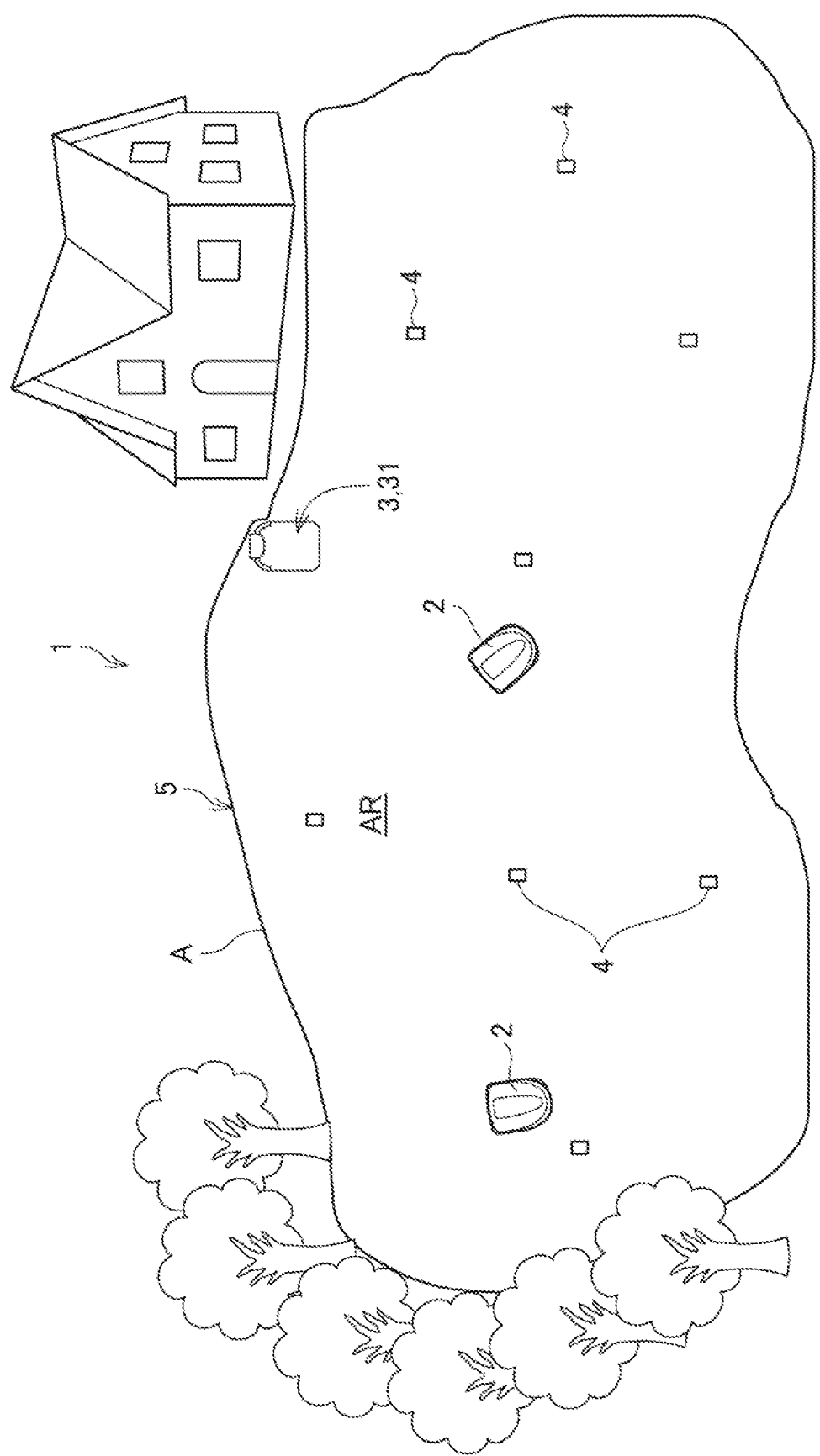
FIG. 1 is a view showing one example of a configuration of a mowing system according to an embodiment of the present invention.

FIG. 1 is a view showing a configuration of a mowing system 1 according to the present embodiment.

The mowing system 1 includes a robotic mower 2, an area wire 5 that defines a mowing area AR where a mowing work is to be executed, a cleaning station 3, and a plurality of sprinklers 4.

The robotic mower 2 is an autonomous traveling work machine that cuts grass while traveling autonomously in the mowing area AR in an unmanned manner. The area wire 5 is a member that is laid along a boundary A by a contractor or the like to allow the robotic mower 2 to detect the boundary A of the mowing area AR. In the present embodiment, the laid area wire 5 is magnetic, and the robotic mower 2 detects magnetism of the area wire 5, detecting the boundary A of the mowing area AR. The robotic mower 2 corresponds to one example of an "autonomous traveling work machine." The mowing area AR corresponds to one example of a "predetermined area."

It should be noted that although in the present embodiment, a case is explained in which the mowing system 1 includes a plurality of (for example, two) robotic mowers 2, embodiments of the present invention are not limited to this. The mowing system 1 may include only one robotic mower 2.

Furthermore, although in the present embodiment, a case is explained in which the robotic mower 2 detects magnetism of the area wire 5, detecting the boundary A of the mowing area AR, embodiments of the present invention are not limited to this. The robotic mower 2 may cause a first imaging device 19 to detect the area wire 5, detecting the boundary A of the mowing area AR. The first imaging device 19 will be explained later in detail with reference to FIG. 2.

The cleaning station 3 is installed in the mowing area AR and supplies the robotic mower 2 with tap water.

The cleaning station 3 includes a control board 31. The control board 31 will be explained later in detail with reference to FIG. 3. The cleaning station 3 is also a standby location of the robotic mower 2 at the time of non-working. At the end of the mowing work, the robotic mower 2 autonomously travels to return to the cleaning station 3 and is cleaned as necessary at the cleaning station 3.

Each of the plurality of sprinklers 4 is installed in the mowing area AR and spreads water on a lawn growing in the mowing area AR. Each of the plurality of sprinklers 4 spreads water for a certain period of time, for example, every time a predetermined time elapses. The predetermined time is, for example, 6 hours, and the certain period of time is, for example, 10 minutes. The plurality of sprinklers 4 correspond to one example of a "work device."

[1-2. Configuration of Robotic Mower]

Figure 2:
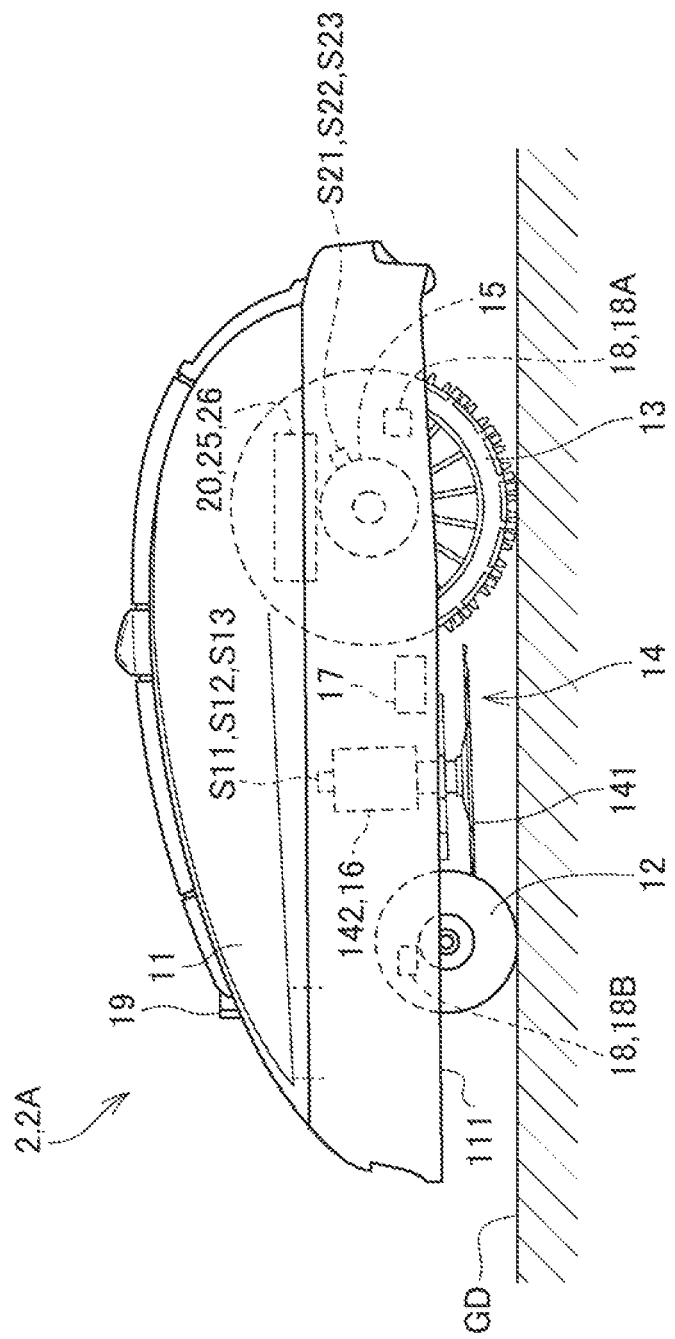
FIG. 2 is a side view showing one example of a configuration of a robotic mower.

FIG. 2 is a side view showing one example of a configuration of the robotic mower 2 according to the present embodiment.

The robotic mower 2 may be referred to as a mower 2 in the following explanation. The mower 2 includes a mower main body 2A and a first controller 20. The first controller 20 controls an operation of the mower main body 2A.

The mower main body 2A includes a housing 11, right and left front wheels 12 that are provided at a front portion of the housing 11, right and left rear wheels 13 that are provided at a rear portion of the housing 11, and a work unit 14 that is provided at a lower center portion of the housing 11.

The work unit 14 includes a work unit driving motor 142 and a cutting blade disc 141 with a cutting blade being provided on a circular plate-shaped disc, and the work unit driving motor 142 rotationally drives the cutting blade disc 141, cutting grass.

The mower main body 2A includes right and left traveling motors 15, a lifting and lowering mechanism 16, a battery 17, a vehicle speed sensor 18, the first imaging device 19, a first communicator 25 (receiver/transmitter), and a charger 26. The housing 11 stores the right and left traveling motors 15, the work unit driving motor 142, the lifting and lowering mechanism 16, the battery 17, the vehicle speed sensor 18, the first controller 20, the first communicator 25, and the charger 26. The housing 11 has a bottom surface 111.

Each of the right and left traveling motors 15 drives the mower 2 to travel. Specifically, the right and left traveling motors 15 individually drive the respective right and left rear wheels 13. The traveling motor 15 drives the rear wheel 13 according to an instruction that is issued by the first controller 20, causing the mower 2 to travel. The traveling motor 15 corresponds to one example of a "second motor."

Each of the traveling motors 15 is equipped with a second power sensor S21, a second voltage sensor S22, and a second current sensor S23. The second power sensor S21 detects a power consumption of the traveling motor 15 during traveling of the mower 2. The second voltage sensor S22 detects a load voltage that is applied to the traveling motor 15 during traveling of the mower 2. The second current sensor S23 detects a load current that flows to the traveling motor 15 during traveling of the mower 2. A detection signal of each of the second power sensor S21, the second voltage sensor S22, and the second current sensor S23 is transmitted to the first controller 20.

The work unit driving motor 142 drives the cutting blade disc 141 and the lifting and lowering mechanism 16. According to an instruction that is issued by the first controller 20, the traveling motor 15 drives the mower 2 to travel, and the work unit driving motor 142 rotationally drives the cutting blade disc 141, executing the mowing work. The mowing work corresponds to one example of a "predetermined work." The work unit driving motor 142 corresponds to one example of a "first motor." According to an instruction that is issued by the first controller 20, the work unit driving motor 142 drives the lifting and lowering mechanism 16, lifting and lowering the cutting blade disc 141.

The work unit driving motor 142 is equipped with a first power sensor S11, a first voltage sensor S12, and a first current sensor S13. The first power sensor S11 detects a power consumption of the work unit driving motor 142 during rotation of the cutting blade disc 141. The first voltage sensor S12 detects a load voltage that is applied to the work unit driving motor 142 during rotation of the cutting blade disc 141. The first current sensor S13 detects a load current that flows to the work unit driving motor 142 during rotation of the cutting blade disc 141. A detection signal of each of the first power sensor S11, the first voltage sensor S12, and the first current sensor S13 is transmitted to the first controller 20.

The lifting and lowering mechanism 16 lifts and lowers the cutting blade disc 141. The battery 17 supplies each unit of the mower 2 with operation power.

The vehicle speed sensor 18 includes a driving wheel vehicle speed sensor 18A and a driven wheel vehicle speed sensor 18B. The driving wheel vehicle speed sensor 18A detects a driving wheel vehicle speed VD corresponding to a peripheral speed of the right and left rear wheels 13 that are driving wheels. The driven wheel vehicle speed sensor 18B detects a driven wheel vehicle speed VN corresponding to a peripheral speed of the right and left front wheels 12 that are driven wheels. A detection signal of each of the driving wheel vehicle speed sensor 18A and the driven wheel vehicle speed sensor 18B is transmitted to the first controller 20.

The first imaging device 19 includes a charge coupled device (CCD) image sensor, a complementary metal-oxide-semiconductor (CMOS) image sensor, or the like and generates a forward image of the mower 2. An image signal that is generated by the first imaging device 19 is transmitted to the first controller 20.

The first controller 20 controls an operation of each unit of the mower 2. Specifically, the first controller 20 controls an operation of the mower 2 so that the mower 2 is cleaned. A configuration of the first controller 20 will be explained later in detail with reference to FIG. 5.

The first communicator 25 communicates with a second communicator 312 (receiver/transmitter) of the cleaning station 3. Specifically, the first communicator 25 communicates with the second communicator 312 by, for example, wireless communication such as Bluetooth (registered trademark). The second communicator 312 will be explained later in detail with reference to FIG. 3.

The charger 26 charges the battery 17. Specifically, the charger 26 is supplied with AC power from a power supplier 34 and converts the AC power into DC power, charging the battery 17. It should be noted that although in the present embodiment, a case is explained in which the charger 26 converts AC power into DC power, the power supplier 34 may convert AC power into DC power. The power supplier 34 will be explained later in detail with reference to FIG. 3.

[1-3. Configuration of Cleaning System]

Figure 3:
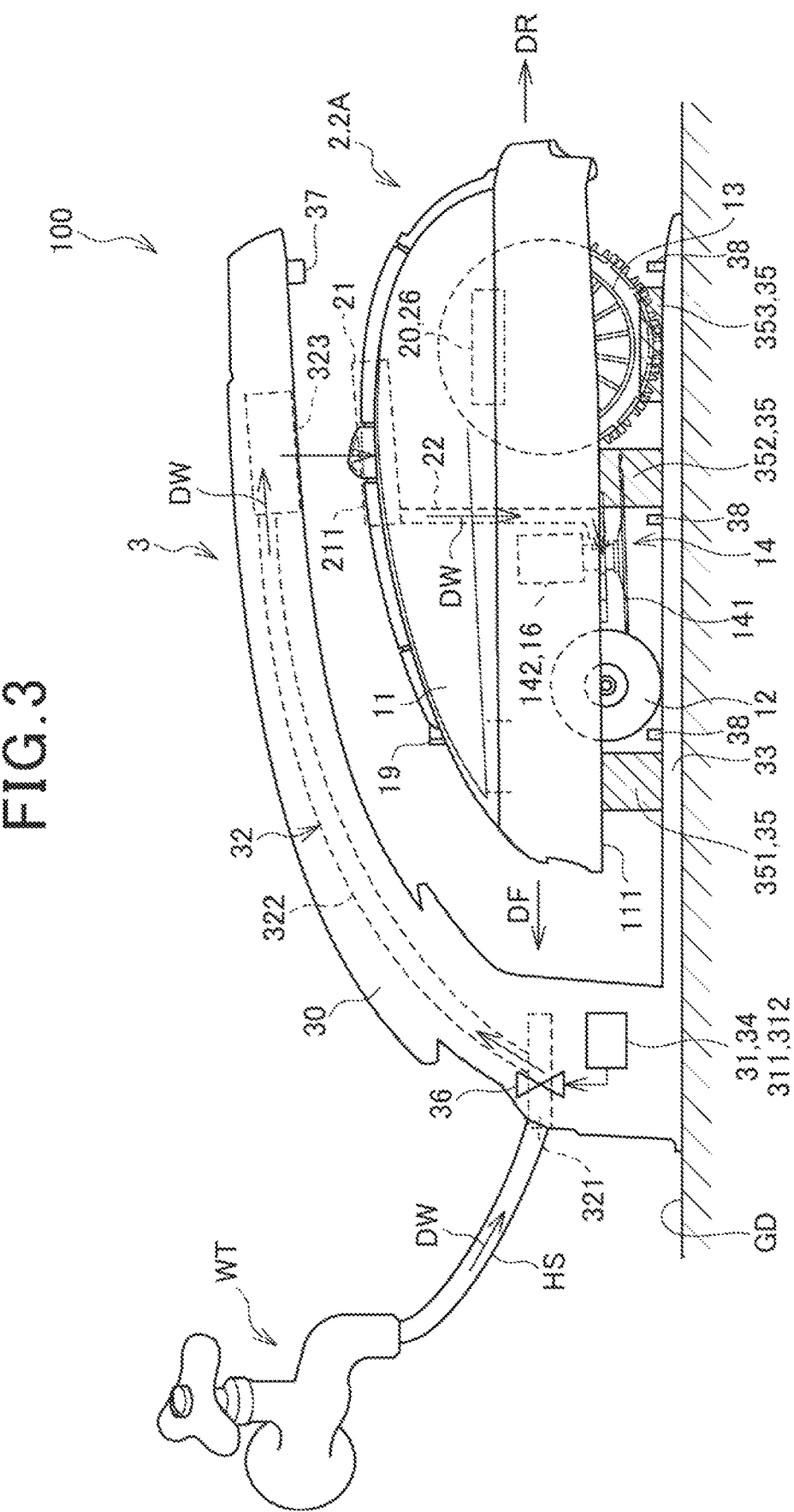
FIG. 3 is a side view showing one example of a configuration of a washing system.

FIG. 3 is a side view showing one example of a configuration of a cleaning system 100.

The cleaning system 100 includes the cleaning station 3 and the mower 2. The cleaning system 100 cleans the mower 2.

The cleaning station 3 includes an arch member 30, the control board 31, a water supplier 32, a placement base 33, the power supplier 34, a sliding member 35, an electric valve 36, a second imaging device 37, and an air blowing mechanism 38.

The arch member 30 forms an arch shape so as to cover the mower 2 when the mower 2 is placed on the placement base 33. The arch member 30 is equipped with the control board 31, the water supplier 32, the power supplier 34, the electric valve 36, and the second imaging device 37.

The control board 31 controls an operation of the cleaning station 3. The control board 31 is equipped with a second controller 311 and the second communicator 312.

The second controller 311 controls the operation of the cleaning station 3. A configuration of the second controller 311 will be explained later in detail with reference to FIG. 5.

The second communicator 312 communicates with the first communicator 25 of the mower 2. Specifically, the second communicator 312 communicates with the first communicator 25 by, for example, wireless communication such as Bluetooth (registered trademark).

The water supplier 32 supplies the mower 2 with the tap water. The water supplier 32 includes an inflow opening 321, a second flow path 322, and an outflow opening 323.

The inflow opening 321 is supplied with the tap water from a faucet WT via a hose HS. The second flow path 322 causes the tap water that is supplied to the inflow opening 321 to flow to the outflow opening 323. The outflow opening 323 supplies a water receiver 21 that is disposed on an upper portion of the mower 2 with the tap water that is supplied from the second flow path 322.

The electric valve 36 is disposed on the second flow path 322 and, according to an instruction that is issued by the second controller 311, blocks or releases the flow of the tap water that is supplied from the faucet WT via the hose HS. Specifically, when washing processing of the mower 2 is executed, the flow of the tap water is released, and when the washing processing of the mower 2 is not executed, the flow of the tap water is blocked.

The second imaging device 37 is disposed downward at an end of the arch member 30 and includes a CCD image sensor, a CMOS image sensor, or the like, generating a dirt image indicating dirt of the mower 2. Specifically, the cleaning station 3 is equipped with a reflection mirror, and via the reflection mirror, the second imaging device 37 generates a dirt image indicating dirt of the bottom surface 111 of the housing 11, a peripheral surface of the front wheel 12, a peripheral surface of the rear wheel 13, and the like.

Furthermore, similarly to the second imaging device 37, the first imaging device 19 also generates a dirt image indicating dirt of the bottom surface 111 of the housing 11, the peripheral surface of the front wheel 12, the peripheral surface of the rear wheel 13, and the like, via the reflection mirror that is equipped on the cleaning station 3.

Each of the first imaging device 19 and the second imaging device 37 corresponds to one example of an "imaging unit." Furthermore, each of the first imaging device 19 and the second imaging device 37 configures part of a "detector."

Although in the present embodiment, a case is explained in which each of the first imaging device 19 and the second imaging device 37 generates a dirt image, the first imaging device 19 or the second imaging device 37 may generate a dirt image.

On the placement base 33, the mower 2 is placed. The outflow opening 323 and the water receiver 21 are disposed such that when the mower 2 is placed on the placement base 33, the water supplier 32 supplies the water receiver 21 with the tap water. One end of the placement base 33 is fixed to a base end of the arch member 30. The one end of the placement base 33 is a left end of the placement base 33 in FIG. 3. An upper surface of the other end of the placement base 33 has irregularities so as to allow the mower 2 to easily move onto the placement base 33. The other end of the placement base 33 is a right end of the placement base 33 in FIG. 3. Furthermore, on an upper surface of the placement base 33, the sliding member 35 is fixed and a nozzle of the air blowing mechanism 38 is disposed.

The sliding member 35 which is fixed on the upper surface of the placement base 33, when the mower 2 travels on the placement base 33, slides on a cleaning target portion of the mower main body 2A. Examples of the cleaning target portion of the mower main body 2A include the bottom surface 111 of the housing 11, the peripheral surface of the front wheel 12, and the peripheral surface of the rear wheel 13. The cleaning target portion is, in other words, a portion to which dirt is likely to adhere. The dirt includes pieces of mowed grass, and dust.

The sliding member 35 includes, for example, a brush. Furthermore, the sliding member 35 may be a columnar-shaped brush that is configured to be rotatable.

The sliding member 35 includes a first sliding member 351, a second sliding member 352, and a third sliding member 353.

The first sliding member 351 slides on a front portion of the bottom surface 111 of the housing 11 and the peripheral surface of the front wheel 12. The second sliding member 352 slides on center and rear portions of the bottom surface 111 of the housing 11. The front portion of the bottom surface 111 indicates a portion on the left side of the bottom surface 111 in FIG. 3, and the rear portion of the bottom surface 111 indicates a portion on the right side of the bottom surface 111 in FIG. 3. The third sliding member 353 slides on the peripheral surface of the rear wheel 13.

The air blowing mechanism 38 discharges air upward from the upper surface of the placement base 33. Specifically, the air blowing mechanism 38 is supplied with compressed air and discharges the compressed air from a plurality of nozzles that are disposed on the upper surface of the placement base 33. Each of the plurality of nozzles is disposed on the upper surface of the placement base 33 so as to discharge the compressed air toward the cleaning target portions such as the bottom surface 111 of the housing 11, the peripheral surface of the front wheel 12, and the peripheral surface of the rear wheel 13.

The cleaning station 3 electrically connects to the mower 2. In other words, when the mower 2 is placed at a predetermined position of the placement base 33, power is supplied to the mower 2 from the cleaning station 3.

When the mower 2 is electrically connected to the cleaning station 3, the power supplier 34 supplies the mower 2 with the power. Specifically, the power supplier 34 supplies the charger 26 of the mower 2 with the power. The power supplier 34 is supplied with AC power from a commercial power source.

The mower 2 includes the water receiver 21 and a first flow path 22.

The water receiver 21 is disposed on an upper portion of the housing 11 and receives the tap water that is supplied from the water supplier 32. The water receiver 21 includes an upper surface opening 211. The water receiver 21 forms, for example, a box shape, and an upper surface thereof forms the upper surface opening 211.

The tap water that flows out of the outflow opening 323 of the water supplier 32 flows into the water receiver 21 via the upper surface opening 211.

The first flow path 22 causes the tap water that flows into the water receiver 21 to flow toward the work unit 14. The first flow path 22 is formed along an up-down direction inside the mower main body 2A. A spreading member 144 causes the tap water that flows in from the first flow path 22 to flow out from between the cutting blade disc 141 of the work unit 14 and the bottom surface 111 of the housing 11. The spreading member 144 will be explained later in detail with reference to FIG. 4.

[1-4. Configuration of Spreading Member]

Figure 4:
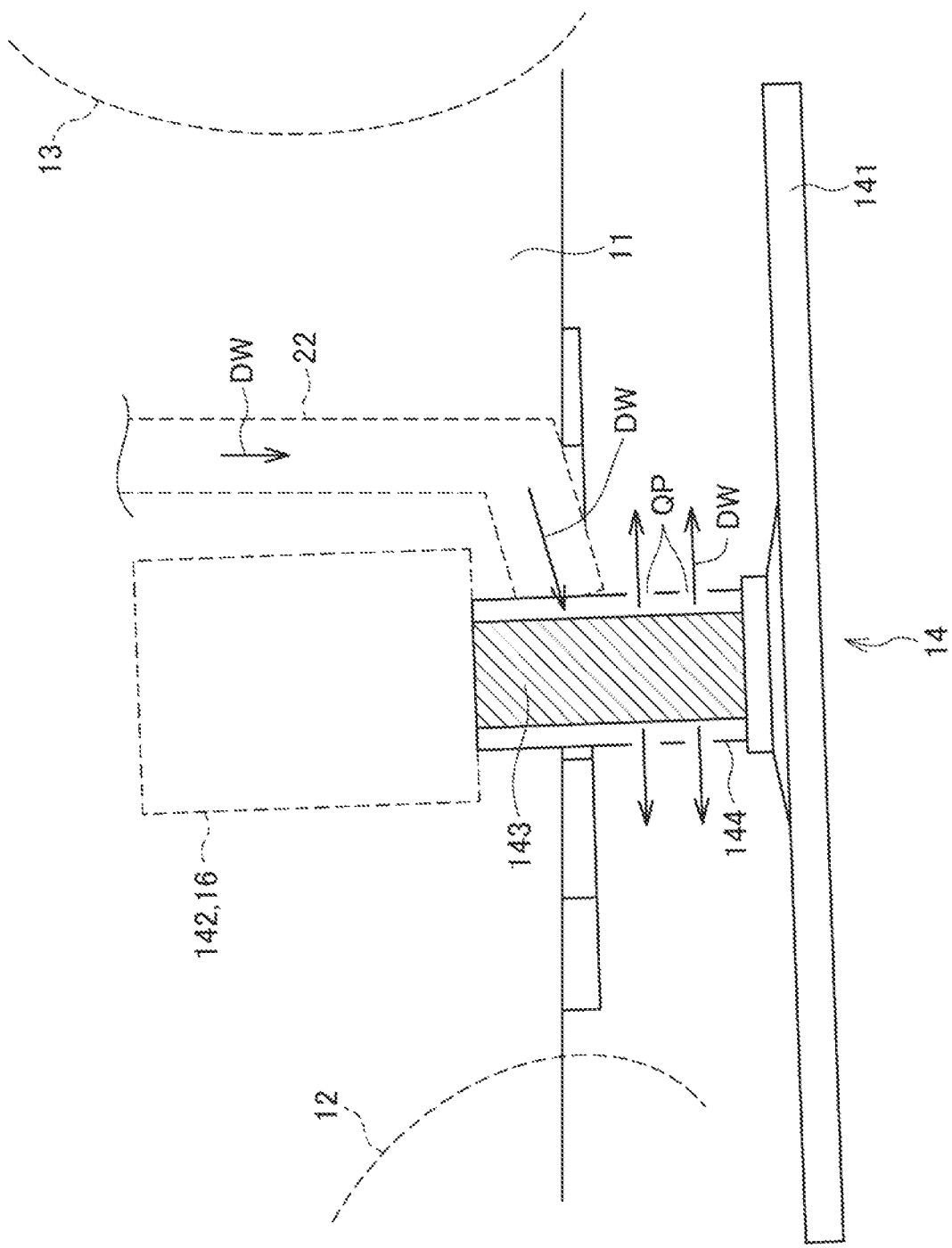
FIG. 4 is a side cross-sectional view showing one example of a configuration of a spreading member.

FIG. 4 is a side cross-sectional view showing one example of a configuration of the spreading member 144. The work unit 14 includes a driving shaft 143 and the spreading member 144.

The driving shaft 143 forms a columnar shape and transmits a rotational torque of the work unit driving motor 142 to the cutting blade disc 141. In other words, the work unit driving motor 142 rotationally drives the cutting blade disc 141 via the driving shaft 143.

The spreading member 144 spreads the tap water on the cutting blade disc 141. The spreading member 144 forms a cylindrical shape, is disposed around the driving shaft 143, and has an opening QP that causes the tap water to flow out. The tap water flows from the first flow path 22 into a gap between the spreading member 144 and the driving shaft 143. Then, the tap water flows out of the opening QP.

Furthermore, the spreading member 144 is rotationally driven by the work unit driving motor 142. Specifically, the spreading member 144 and the driving shaft 143 are integrated, and in such an integrated manner, the spreading member 144 and the driving shaft 143 are rotationally driven by the work unit driving motor 142.

Thus, the spreading member 144 and the driving shaft 143 are rotationally driven by the work unit driving motor 142 in the integrated manner, causing the tap water that flows into the gap between the spreading member 144 and the driving shaft 143 to flow out of the opening QP in a direction DW by centrifugal force. The direction DW indicates a direction in which the tap water flows out of the opening QP.

[1-5. Configuration of First Controller]

Figure 5:
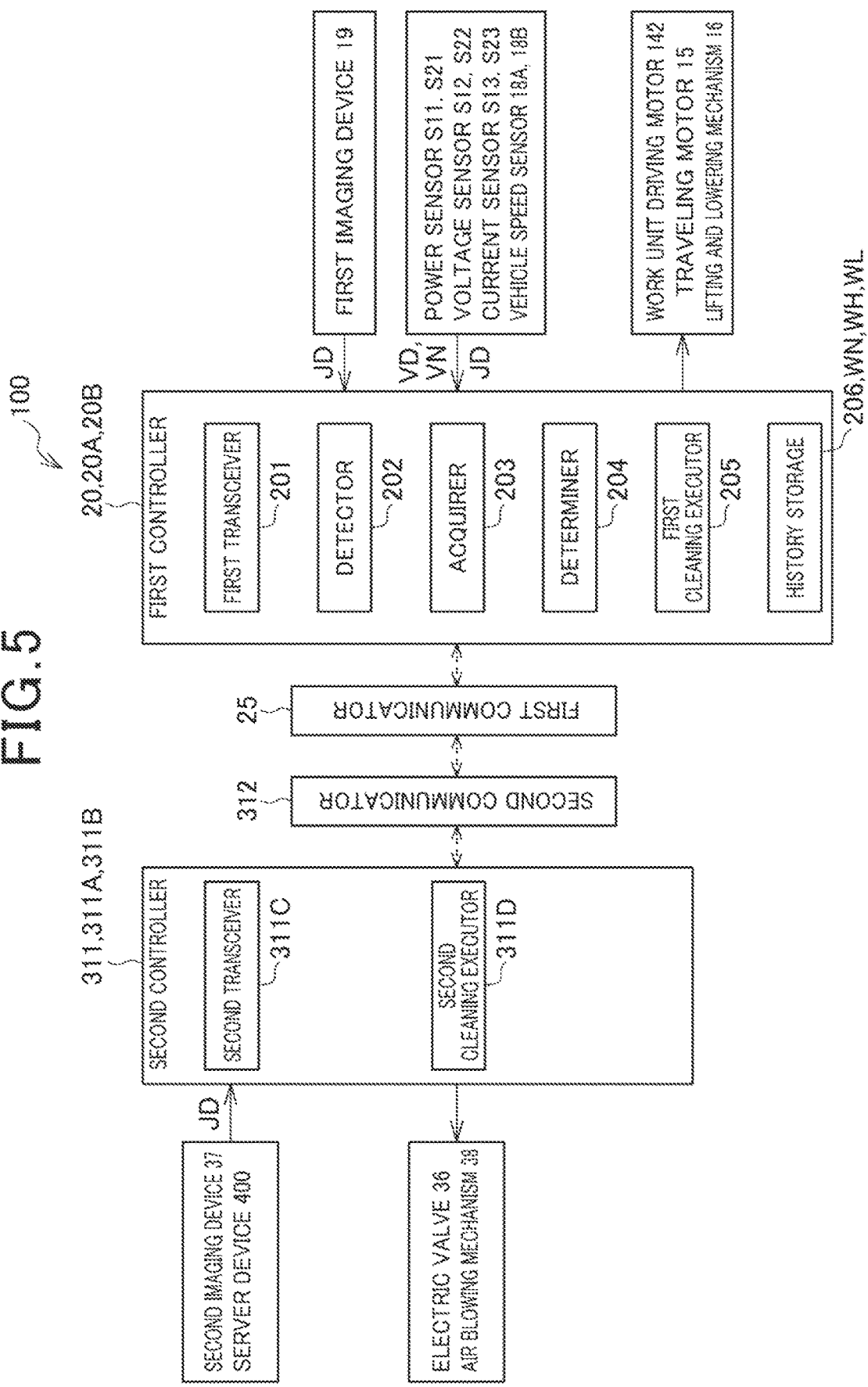
FIG. 5 is a view showing one examples of configurations of a first controller and a second controller.

FIG. 5 is a view showing one examples of configurations of the first controller 20 and the second controller 311.

The first controller 20 has, for example, a first processor 20A such as a central processing unit (CPU) and a memory 20B such as a random access memory (RAM) or a read only memory (ROM). The memory 20B stores work target area related map data, mowing work schedule data, and data of, for example, a first control program.

The first processor 20A executes the first control program to function as a first transceiver 201, a detector 202, an acquirer 203, a determiner 204, and a first cleaning executor 205. Furthermore, the first processor 20A executes the first control program to cause the memory 20B to function as a history storage 206.

The first controller 20 is communicably connected to the first imaging device 19, the driving wheel vehicle speed sensor 18A, the driven wheel vehicle speed sensor 18B, the first power sensor S11, the first voltage sensor S12, the first current sensor S13, the second power sensor S21, the second voltage sensor S22, the second current sensor S23, the work unit driving motor 142, the traveling motor 15, and the lifting and lowering mechanism 16.

The history storage 206 stores information indicating a work frequency WN, information indicating a work time WH, and information indicating a travel distance WL during work. It should be noted that the information indicating the work frequency WN, the information indicating the work time WH, and the information indicating the travel distance WL during work are recorded in the history storage 206 by the first controller 20 and read out by the acquirer 203.

The work frequency WN indicates a number of times the mower 2 executes the mowing work. Specifically, when the first cleaning executor 205 executes cleaning, the first controller 20 resets the work frequency WN. In other words, after cleaning is executed, the work frequency WN indicates the number of times the mower 2 executes the mowing work.

The work time WH indicates an integrated value of a time during which the mower 2 executes the mowing work. Specifically, when the first cleaning executor 205 executes cleaning, the first controller 20 resets the work time WH. In other words, after cleaning is executed, the work time WH indicates the integrated value of the time during which the mower 2 executes the mowing work.

The travel distance WL indicates an integrated value of a distance in which the mower 2 travels during execution of the mowing work. Specifically, when the first cleaning executor 205 executes cleaning, the first controller 20 resets the travel distance WL. In other words, after cleaning is executed, the travel distance WL indicates the integrated value of the distance in which the mower 2 travels during execution of the mowing work.

The history storage 206 stores information indicating a dirt image that is generated by each of the first imaging device 19 and the second imaging device 37. It should be noted that the information indicating a dirt image that is generated by the second imaging device 37 is acquired by the first controller 20 via the second controller 311 and the second communicator 312 in this order.

Furthermore, the history storage 206 stores information indicating the driving wheel vehicle speed VD that is detected by the driving wheel vehicle speed sensor 18A, and information indicating the driven wheel vehicle speed VN that is detected by the driven wheel vehicle speed sensor 18B. It should be noted that when the mower 2 moves to the cleaning station 3, the driving wheel vehicle speed VD and the driven wheel vehicle speed VN are acquired by the first controller 20 from the driving wheel vehicle speed sensor 18A and the driven wheel vehicle speed sensor 18B.

Furthermore, the history storage 206 stores information indicating a power value that is detected by the first power sensor S11, information indicating a voltage value that is detected by the first voltage sensor S12, and information indicating a current value that is detected by the first current sensor S13. Furthermore, the history storage 206 stores information indicating a power value that is detected by the second power sensor S21, information indicating a voltage value that is detected by the second voltage sensor S22, and information indicating a current value that is detected by the second current sensor S23.

Furthermore, the history storage 206 stores weather information, temperature information, and humidity information that relate to the mowing area AR when the mower 2 is in execution of the mowing work. The weather information, the temperature information, and the humidity information are, for example, acquired by the second controller 311 from a server device 400, transmitted to the first controller 20, and recorded in the history storage 206 by the first controller 20.

Furthermore, the history storage 206 stores operation information of the plurality of sprinklers 4 that are disposed in the mowing area AR. The operation information of the plurality of sprinklers 4 is, for example, acquired by the second controller 311 from the server device 400, transmitted to the first controller 20, and recorded in the history storage 206 by the first controller 20.

The first transceiver 201 transmits and receives a variety of information to and from the second controller 311 via the first communicator 25 and the second communicator 312. The first transceiver 201, for example, receives from the second controller 311 the information indicating a dirt image that is generated by the second imaging device 37. The first transceiver 201, for example, transmits to the second controller 311 instruction information for opening and closing the electric valve 36.

The detector 202 detects dirt of the mower main body 2A. Specifically, the detector 202 generates information indicating a dirt image via the first imaging device 19 and the second imaging device 37. More specifically, the detector 202 receives a signal indicating a dirt image from each of the first imaging device 19 and the second imaging device 37 and generates the information indicating the dirt image.

Furthermore, when the mower 2 executes the mowing work, the detector 202 acquires a detection value of each of the first power sensor S11, the first voltage sensor S12, and the first current sensor S13 and records the detection value in the history storage 206.

Furthermore, during a period from when the mower 2 starts moving to the cleaning station 3 to when the mower 2 completes moving to the cleaning station 3, the detector 202 acquires a detection value of each of the second power sensor S21, the second voltage sensor S22, and the second current sensor S23 and records the detection value in the history storage 206.

Furthermore, during the period from when the mower 2 starts moving to the cleaning station 3 to when the mower 2 completes moving to the cleaning station 3, the detector 202 acquires the driving wheel vehicle speed VD and the driven wheel vehicle speed VN from the driving wheel vehicle speed sensor 18A and the driven wheel vehicle speed sensor 18B and records the driving wheel vehicle speed VD and the driven wheel vehicle speed VN in the history storage 206.

The acquirer 203 acquires dirt information JD relating to a state of dirt of the mower main body 2A.

Specifically, the acquirer 203 reads out, as the dirt information JD, a work history of the mower 2 from the history storage 206. The work history includes the work frequency WN, the work time WH, and the travel distance WL.

Furthermore, the acquirer 203 acquires from the history storage 206 the information indicating a dirt image that is generated by the detector 202.

Furthermore, the acquirer 203 acquires, as the dirt information JD, the information indicating a power value that is detected by the first power sensor S11, the information indicating a voltage value that is detected by the first voltage sensor S12, and the information indicating a current value that is detected by the first current sensor S13, from the history storage 206.

Furthermore, the acquirer 203 acquires, as the dirt information JD, the information indicating a power value that is detected by the second power sensor S21, the information indicating a voltage value that is detected by the second voltage sensor S22, and the information indicating a current value that is detected by the second current sensor S23, from the history storage 206.

Furthermore, during the period from when the mower 2 starts moving to the cleaning station 3 to when the mower 2 completes moving to the cleaning station 3, the acquirer 203 acquires, as the dirt information JD, a slip ratio λ of the driving wheel. The acquirer 203 uses the driven wheel vehicle speed VN and the driving wheel vehicle speed VD that are stored in the history storage 206 and calculates the slip ratio λ by the following formula (1).

$$\lambda = (VD - VN)/VN \quad (1)$$

It should be noted that the slip ratio λ, not limited to the above formula (1), may be calculated by the following formula (2).

$$\lambda = (VD - \text{vehicle body speed})/(\text{vehicle body speed}) \quad (2)$$

It should be noted that the vehicle body speed indicates a travel speed of the mower 2 with respect to a road surface. Furthermore, the vehicle body speed may be obtained based on the driven wheel vehicle speed VN and also be obtained based on a detection signal of a speed sensor that detects the vehicle body speed.

Furthermore, the acquirer 203 acquires, as the dirt information JD, the weather information, the temperature information, and the humidity information that relate to the mowing area AR when the mower 2 is in execution of the mowing work, from the history storage 206. Furthermore, the acquirer 203 acquires, as the dirt information JD, the operation information of the plurality of sprinklers 4 that are disposed in the mowing area AR, from the history storage 206.

The determiner 204 determines, based on the dirt information JD, a necessity of cleaning the mower 2 and a method of cleaning the mower 2. Specifically, the determiner 204 executes "necessity determination processing" that determines the necessity of cleaning the mower 2, and "method determination processing" that determines the method of cleaning the mower 2.

The "necessity determination processing" will be explained later in detail with reference to FIG. 8. The "method determination processing" will be explained later in detail with reference to FIG. 9.

Although in the present embodiment, a case is explained in which the determiner 204 determines the necessity of cleaning the mower 2 and the method of cleaning the mower 2, embodiments of the present invention are not limited to this. The determiner 204 may determine at least one of the necessity of cleaning the mower 2 and the method of cleaning the mower 2. The determiner 204, for example, may determine only the necessity of cleaning the mower 2, and the determiner 204, for example, may determine only the method of cleaning. When only the method of cleaning is determined, the first cleaning executor 205 always executes a cleaning operation every time the mower 2 moves to the cleaning station 3 after executing the mowing work.

According to a determination result of the determiner 204, the first cleaning executor 205 executes the cleaning operation.

Specifically, when the determiner 204 determines that cleaning is unnecessary, the first cleaning executor 205 does not execute the cleaning operation. When the determiner 204 determines that cleaning is necessary, the first cleaning executor 205 executes the cleaning operation by a method of cleaning that is determined by the determiner 204.

In the present embodiment, the method of cleaning includes "air blowing" and "washing." In the "air blowing," in a state where the electric valve 36 is closed, that is, without the water supplier 32 supplying the water receiver 21 with the tap water, the air blowing mechanism 38 discharges compressed air toward, for example, the bottom surface 111 of the housing 11. In the "washing," in a state where the electric valve 36 is opened, that is, with the water supplier 32 supplying the water receiver 21 with the tap water, the tap water flows out of the opening QP of the spreading member 144, and the mower 2 travels to cause, for example, the bottom surface 111 of the housing 11 to slide on the sliding member 35.

The cleaning operation of the first cleaning executor 205 will be explained later in detail with reference to FIG. 10. The first cleaning executor 205 corresponds to one example of a "cleaning executor."

[1-6. Configuration of Second Controller]

The second controller 311 has, for example, a second processor 311A such as a CPU and a second memory 311B such as RAM or ROM. The second memory 311B stores data of, for example, a second control program.

The second processor 311A executes the second control program to function as a second transceiver 311C and a second cleaning executor 311D.

The second controller 311 is communicably connected to the electric valve 36 and the second imaging device 37 that are disposed on the arch member 30, and the air blowing mechanism 38 that is disposed on the placement base 33. Furthermore, the second controller 311 is communicably connected to the server device 400 via a network such as the Internet.

The second controller 311, for example, acquires from the server device 400 the weather information, the temperature information, and the humidity information when the mower 2 is in execution of the mowing work. Furthermore, the second controller 311, for example, acquires from the server device 400 the operation information of the plurality of sprinklers 4 that are disposed in the mowing area AR.

In the present embodiment, the plurality of sprinklers 4 perform a water sprinkling operation, according to an instruction that is issued by the server device 400.

The second transceiver 311C transmits and receives a variety of information to and from the first controller 20 via the first communicator 25 and the second communicator 312. The second transceiver 311C, for example, transmits to the first controller 20 the information indicating a dirt image that is generated by the second imaging device 37. The second transceiver 311C, for example, receives from the first controller 20 the instruction information for opening and closing the electric valve 36.

The second cleaning executor 311D causes each of the electric valve 36 and the air blowing mechanism 38 to operate, according to an instruction that is issued by the first controller 20.

[1-7. Washing Processing]

Next, with reference to FIGS. 3 and 5, a function of the first cleaning executor 205 is explained when the determiner 204 determines that cleaning is necessary and determines that the mower 2 is to be washed.

The first cleaning executor 205 causes the work unit driving motor 142 to rotationally drive the cutting blade disc 141. When the mower 2 is washed, the cutting blade disc 141 rotates, and thereby the tap water that flows out of the spreading member 144 is spread around the cutting blade disc 141. Specifically, the cutting blade disc 141 rotates, and thereby the tap water that flows out of the spreading member 144 is spread on the cleaning target portions such as the bottom surface 111 of the housing 11, the peripheral surface of the front wheel 12, and the peripheral surface of the rear wheel 13.

Furthermore, the first cleaning executor 205 causes the work unit driving motor 142 to rotationally drive the spreading member 144. When the mower main body 2A is washed, the spreading member 144 rotationally drives, and thereby the tap water flows out of the spreading member 144.

Furthermore, the first cleaning executor 205, when the mower main body 2A is cleaned, causes the lifting and lowering mechanism 16 to lower the cutting blade disc 141. Lowering the cutting blade disc 141 widens a gap between the bottom surface 111 of the housing 11 and the cutting blade disc 141, making it easier to remove dirt that adheres to the bottom surface 111 of the housing 11.

Furthermore, the first cleaning executor 205, when the mower 2 moves to the cleaning station 3, that is, when the mower 2 moves onto the placement base 33, causes the lifting and lowering mechanism 16 to lift the cutting blade disc 141. Lifting the cutting blade disc 141 can prevent the cutting blade disc 141 from being in contact with the upper surface of the placement base 33 when the mower 2 moves onto the placement base 33. This makes it easier for the mower 2 to move to the cleaning station 3.

Furthermore, the first cleaning executor 205 causes the traveling motor 15 to drive the mower 2 to travel such that the mower main body 2A is cleaned. Specifically, the first cleaning executor 205 causes the traveling motor 15 to drive the mower 2 to travel such that the cleaning target portion of the mower main body 2A slides on the sliding member 35 that is disposed on the cleaning station 3. For example, the mower 2 is driven to travel in a front direction DF and a rear direction DR, and thereby the cleaning target portion of the mower main body 2A can slide on the sliding member 35.

2. Processing of First Controller

[2-1. Overall Processing of First Controller]

Figure 6:
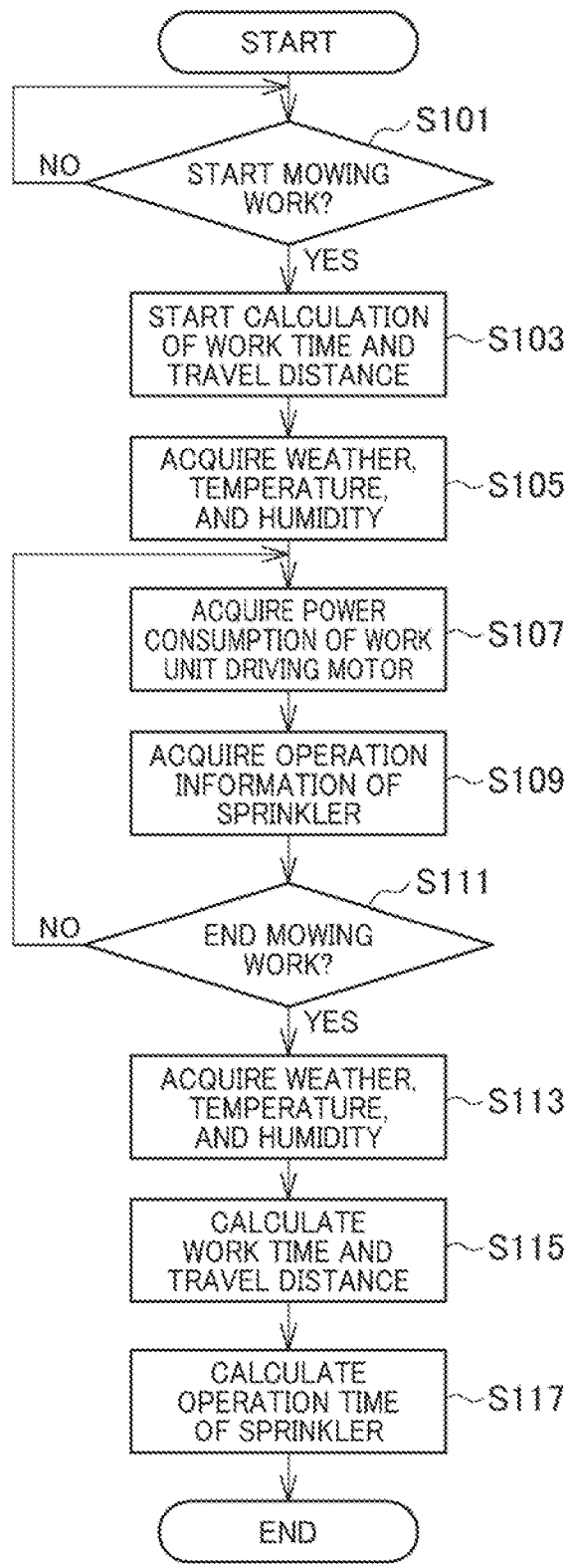
FIG. 6 is a flowchart showing one example of overall processing of the first controller.
Figure 7:
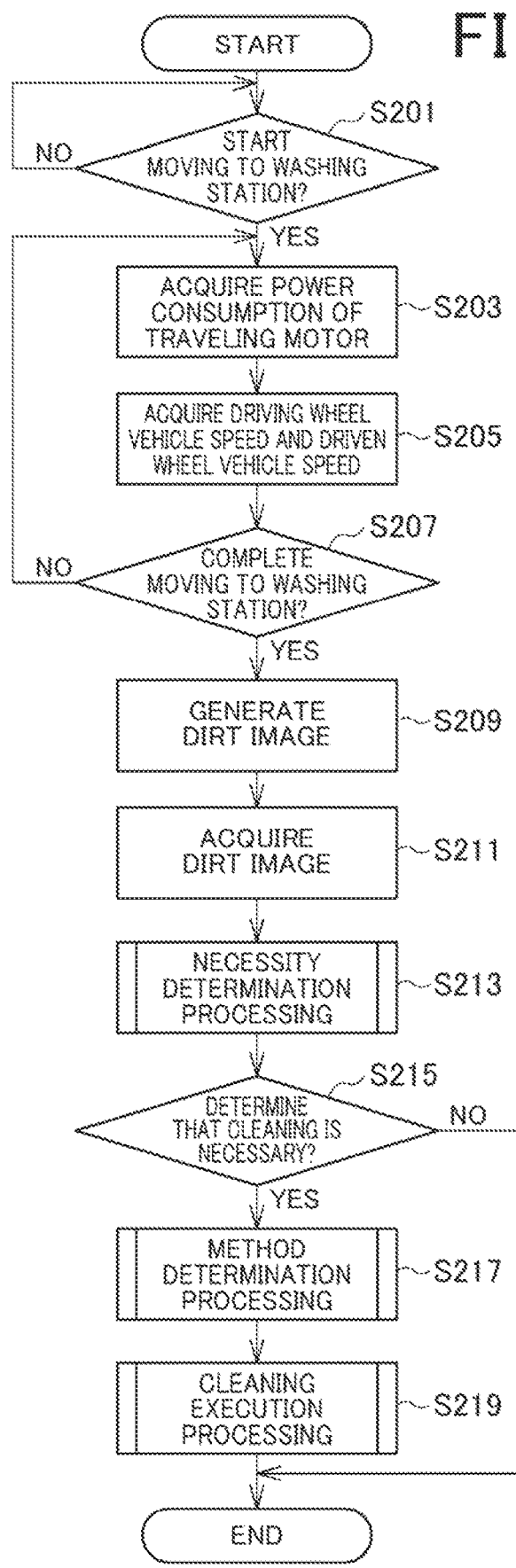
FIG. 7 is a flowchart showing one example of overall processing of the first controller.

Each of FIGS. 6 and 7 is a flowchart showing one example of overall processing of the first controller 20.

First, as shown in FIG. 6, in step S101, the first controller 20 determines whether the mowing work is to be started, based on the mowing work schedule data that is stored in the memory 20B.

When the first controller 20 determines that the mowing work is not to be started (NO in step S101), the processing enters a standby state. When the first controller 20 determines that the mowing work is to be started (YES in step S101), the processing proceeds to step S103.

In step S103, the first controller 20 starts the mowing work based on the work target area related map data and the mowing work schedule data that are stored in the memory 20B and starts calculating the work time WH and the travel distance WL.

Next, in step S105, the first controller 20 acquires from the server device 400 the weather information, the temperature information, and the humidity information that relate to the mowing area AR and records these pieces of information in the history storage 206. Specifically, the first controller 20 outputs to the second controller 311 instruction information for acquiring from the server device 400 the weather information, the temperature information, and the humidity information that relate to the mowing area AR. The second controller 311, according to an instruction that is issued by the first controller 20, acquires from the server device 400 the weather information, the temperature information, and the humidity information that relate to the mowing area AR and transmits these pieces of information to the first controller 20.

Next, in step S107, the detector 202 acquires a power value of the work unit driving motor 142 from the first power sensor S11 and records information indicating the power value of the work unit driving motor 142 in the history storage 206.

Next, in step S109, the first controller 20 acquires from the server device 400 the operation information of the plurality of sprinklers 4 that are disposed in the mowing area AR and records the operation information of the plurality of sprinklers 4 in the history storage 206. The operation information includes information indicating whether water sprinkling is made by the plurality of sprinklers 4.

Next, in step S111, the first controller 20 determines whether the mowing work is to be ended, based on the work target area related map data and the mowing work schedule data that are stored in the memory 20B.

When the first controller 20 determines that the mowing work is not to be ended (NO in step S111), the processing returns to step S107. When the first controller 20 determines that the mowing work is to be ended (YES in step S111), the processing proceeds to step S113.

In step S113, the first controller 20 acquires from the server device 400 the weather information, the temperature information, and the humidity information that relate to the mowing area AR and records these pieces of information in the history storage 206.

Next, in step S115, the first controller 20 calculates the work time WH and the travel distance WL and records the calculated work time WH and the calculated travel distance WL in the history storage 206.

Next, in step S117, the first controller 20 calculates an operation time WS of the sprinkler 4 and records the calculated operation time WS in the history storage 206, and thereafter the processing ends. The operation time WS indicates a time during which the sprinkler 4 operates when the mower 2 is in execution of the mowing work.

Furthermore, as shown in FIG. 7, in step S201, the first controller 20 determines whether the move of the mower 2 to the cleaning station 3 is started. Specifically, the first controller 20 determines whether the move of the mower 2 to the cleaning station 3 is started, based on, for example, an image that is imaged by the second imaging device 37.

When the first controller 20 determines that the move of the mower 2 to the cleaning station 3 is not started (NO in step S201), the processing enters a standby state. When the first controller 20 determines that the move of the mower 2 to the cleaning station 3 is started (YES in step S201), the processing proceeds to step S203.

In step S203, the detector 202 acquires a detection value of a power consumption of the traveling motor 15 from the second power sensor S21 and records the detection value in the history storage 206.

Next, in step S205, the detector 202 acquires the driving wheel vehicle speed VD and the driven wheel vehicle speed VN from the driving wheel vehicle speed sensor 18A and the driven wheel vehicle speed sensor 18B and records the driving wheel vehicle speed VD and the driven wheel vehicle speed VN in the history storage 206.

Next, in step S207, the first controller 20 determines whether the move of the mower 2 to the cleaning station 3 is completed. Specifically, the first controller 20 determines whether the move of the mower 2 to the cleaning station 3 is completed, based on, for example, an image that is imaged by the second imaging device 37.

When the first controller 20 determines that the move of the mower 2 to the cleaning station 3 is not completed (NO in step S207), the processing returns to step S203. When the first controller 20 determines that the move of the mower 2 to the cleaning station 3 is completed (YES in step S207), the processing proceeds to step S209.

Next, in step S209, the detector 202 generates a dirt image via the first imaging device 19 and the second imaging device 37 and records the dirt image in the history storage 206.

Next, in step S211, the acquirer 203 acquires the information indicating the dirt image from the history storage 206.

Next, in step S213, the determiner 204 executes the "necessity determination processing." The "necessity determination processing" indicates processing to determine the necessity of cleaning the mower 2. The "necessity determination processing" will be explained later in detail with reference to FIG. 8.

Next, in step S215, the first controller 20 determines whether cleaning is determined to be necessary in the "necessity determination processing."

When the first controller 20 determines that cleaning is not determined to be necessary in the "necessity determination processing" (NO in step S215), the processing ends. When the first controller 20 determines that cleaning is determined to be necessary in the "necessity determination processing" (YES in step S215), the processing proceeds to step S217.

In step S217, the determiner 204 executes the "method determination processing." The "method determination processing" indicates processing to determine the method of cleaning the mower 2. The "method determination processing" will be explained later in detail with reference to FIG. 9.

Next, in step S219, the first cleaning executor 205 executes "cleaning execution processing," and thereafter the processing ends. The "cleaning execution processing" indicates processing to execute cleaning of the mower 2 by the method of cleaning that is determined in step S217. The "cleaning execution processing" will be explained later in detail with reference to FIG. 10.

[2-2. Necessity Determination Processing of First Controller]

Figure 8:
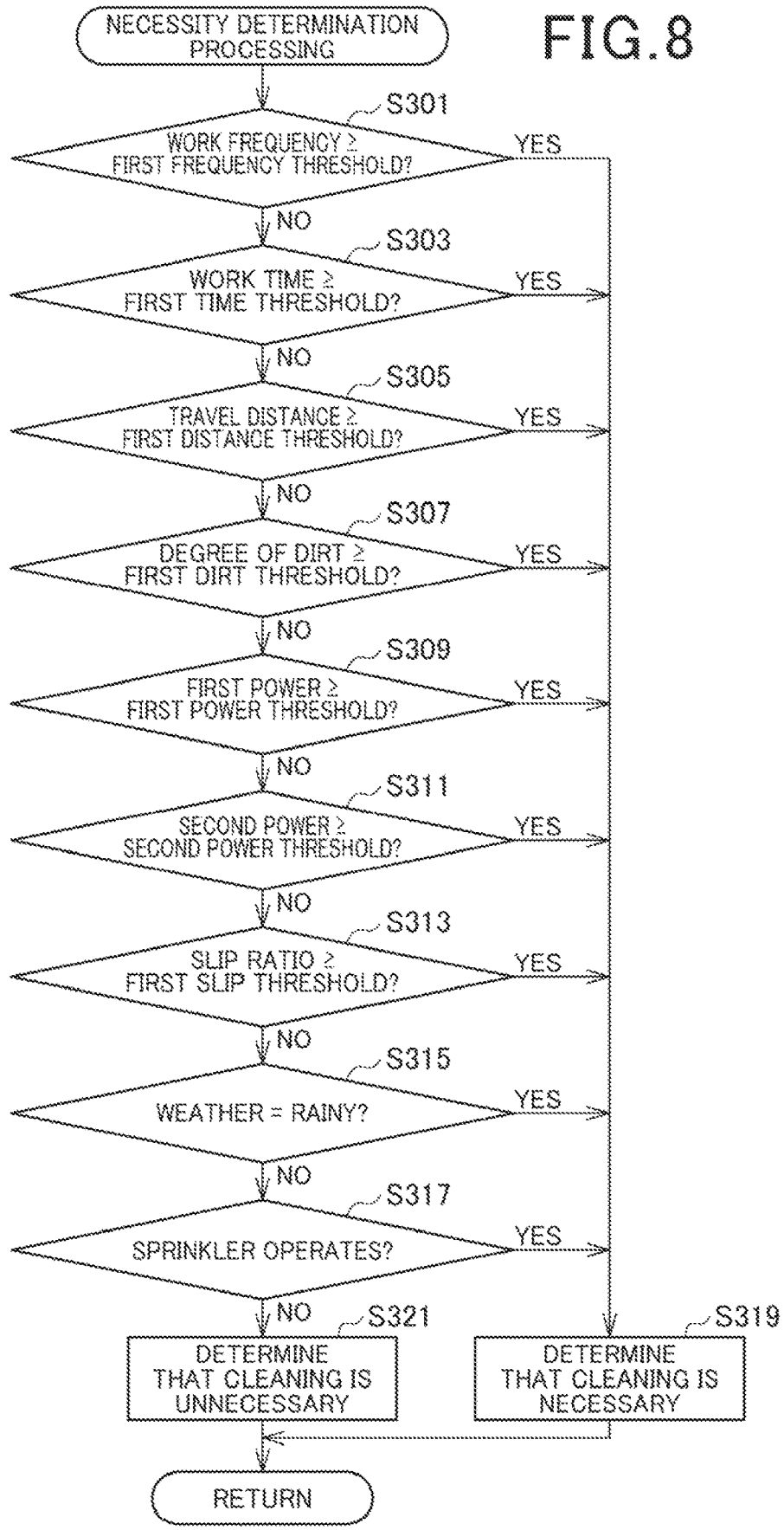
FIG. 8 is a flowchart showing one example of necessity determination processing of the first controller.

FIG. 8 is a flowchart showing one example of the necessity determination processing of the first controller 20.

First, as shown in FIG. 8, in step S301, the acquirer 203 acquires the work frequency WN from the history storage 206, and the determiner 204 determines whether the work frequency WN is equal to or greater than a first frequency threshold NS1. The first frequency threshold NS1 indicates a threshold of the work frequency WN that serves as a criterion for determining the necessity of cleaning. The first frequency threshold NS1 is, for example, 3 times.

When the determiner 204 determines that the work frequency WN is equal to or greater than the first frequency threshold NS1 (YES in step S301), the processing proceeds to step S319. When the determiner 204 determines that the work frequency WN is not equal to or greater than the first frequency threshold NS1 (NO in step S301), the processing proceeds to step S303.

In step S303, the acquirer 203 acquires the work time WH from the history storage 206, and the determiner 204 determines whether the work time WH is equal to or greater than a first time threshold HS1. The first time threshold HS1 indicates a threshold of the work time WH that serves as a criterion for determining the necessity of cleaning. The first time threshold HS1 is, for example, 1 hour.

When the determiner 204 determines that the work time WH is equal to or greater than the first time threshold HS1 (YES in step S303), the processing proceeds to step S319. When the determiner 204 determines that the work time WH is not equal to or greater than the first time threshold HS1 (NO in step S303), the processing proceeds to step S305.

In step S305, the acquirer 203 acquires the travel distance WL from the history storage 206, and the determiner 204 determines whether the travel distance WL is equal to or greater than a first distance threshold LS1. The first distance threshold LS1 indicates a threshold of the travel distance WL that serves as a criterion for determining the necessity of cleaning. The first distance threshold LS1 is, for example, 500 m.

When the determiner 204 determines that the travel distance WL is equal to or greater than the first distance threshold LS1 (YES in step S305), the processing proceeds to step S319. When the determiner 204 determines that the travel distance WL is not equal to or greater than the first distance threshold LS1 (NO in step S305), the processing proceeds to step S307.

In step S307, the determiner 204 determines whether a degree of dirt of the mower 2 is equal to or greater than a first dirt threshold. The degree of dirt of the mower 2 is calculated by the first controller 20 based on a dirt image that is generated by each of the first imaging device 19 and the second imaging device 37. The first controller 20, for example, performs image processing on the dirt image and evaluates the degree of dirt on a 5-point scale of 1 to 5. As dirt becomes severer, a numerical value indicating the degree of dirt increases. The first dirt threshold indicates a threshold of the degree of dirt that serves as a criterion for determining the necessity of cleaning. The first dirt threshold is, for example, 2.

When the determiner 204 determines that the degree of dirt of the mower 2 is equal to or greater than the first dirt threshold (YES in step S307), the processing proceeds to step S309. When the determiner 204 determines that the degree of dirt of the mower 2 is not equal to or greater than the first dirt threshold (NO in step S307), the processing proceeds to step S309.

In step S309, the acquirer 203 acquires a first power value from the history storage 206, and the determiner 204 determines whether the first power value is equal to or greater than a first power threshold. The first power value indicates, for example, a maximum value of power that is consumed by the work unit driving motor 142 when the mower 2 is in execution of the mowing work. The first power threshold indicates a threshold of the first power value that serves as a criterion for determining the necessity of cleaning. It should be noted that, for example, as more dirt is deposited around the cutting blade disc 141, the first power value increases, and accordingly the first power value can be used as the dirt information JD.

When the determiner 204 determines that the first power value is equal to or greater than the first power threshold (YES in step S309), the processing proceeds to step S319. When the determiner 204 determines that the first power value is not equal to or greater than the first power threshold (NO in step S309), the processing proceeds to step S311.

In step S311, the acquirer 203 acquires a second power value from the history storage 206, and the determiner 204 determines whether the second power value is equal to or greater than a second power threshold. The second power value indicates, for example, a maximum value of power that is consumed by the traveling motor 15 during the period from when the mower 2 starts moving to the cleaning station 3 to when the mower 2 completes moving to the cleaning station 3. The second power threshold indicates a threshold of the second power value that serves as a criterion for determining the necessity of cleaning. It should be noted that, for example, as more dirt is deposited on the rear wheel 13 that is a driving wheel, the second power value increases, and accordingly the second power value can be used as the dirt information JD.

When the determiner 204 determines that the second power value is equal to or greater than the second power threshold (YES in step S311), the processing proceeds to step S319. When the determiner 204 determines that the second power value is not equal to or greater than the second power threshold (NO in step S311), the processing proceeds to step S313.

In step S313, the acquirer 203 acquires the driving wheel vehicle speed VD and the driven wheel vehicle speed VN from the history storage 206 and calculates the slip ratio λ by the above formula (1), and the determiner 204 determines whether a maximum value of the slip ratio λ is equal to or greater than a first slip threshold. The first slip threshold indicates the maximum value of the slip ratio λ that serves as a criterion for determining the necessity of cleaning. It should be noted that, for example, as more dirt is deposited on the rear wheel 13 that is a driving wheel, the slip ratio λ increases, and accordingly the slip ratio λ can be used as the dirt information JD.

When the determiner 204 determines that the maximum value of the slip ratio λ is equal to or greater than the first slip threshold (YES in step S313), the processing proceeds to step S319. When the determiner 204 determines that the maximum value of the slip ratio λ is not equal to or greater than the first slip threshold (NO in step S313), the processing proceeds to step S315.

In step S315, the acquirer 203 acquires the weather information from the history storage 206, and the determiner 204 determines whether the weather in the mowing area AR is rainy when the mower 2 is in execution of the mowing work. When the weather is rainy, moisture adheres to the lawn, and pieces of grass that is mowed by the cutting blade disc 141 are likely to adhere to the mower main body 2A via water. Accordingly, the weather can be used as the dirt information JD.

When the determiner 204 determines that the weather in the mowing area AR is rainy (YES in step S315), the processing proceeds to step S319. When the determiner 204 determines that the weather in the mowing area AR is not rainy (NO in step S315), the processing proceeds to step S317.

In step S317, the acquirer 203 acquires the operation time WS of the sprinkler 4 from the history storage 206, and the determiner 204 determines whether the water sprinkling operation is executed by the sprinkler 4 for equal to or greater than a first water-sprinkling time when the mower 2 is in execution of the mowing work. In other words, the determiner 204 determines whether the operation time WS is equal to or greater than the first water-sprinkling time. The first time is, for example, 10 minutes. When the water sprinkling operation is executed by the sprinkler 4 for equal to or greater than the first water-sprinkling time, moisture adheres to the lawn, and pieces of grass that is mowed by the cutting blade disc 141 are likely to adhere to the mower main body 2A via water. Accordingly, the operation information of the sprinkler 4 can be used as the dirt information JD.

When the determiner 204 determines that the water sprinkling operation is executed by the sprinkler 4 for equal to or greater than the first water-sprinkling time (YES in step S317), the processing proceeds to step S319.

In step S319, the determiner 204 determines that cleaning of the mower 2 is necessary, and the processing returns to step S215 in FIG. 7.

When the determiner 204 determines that the water sprinkling operation is not executed by the sprinkler 4 for equal to or greater than the first water-sprinkling time (NO in step S317), the processing proceeds to step S321.

In step S321, the determiner 204 determines that cleaning of the mower 2 is unnecessary, and the processing returns to step S215 in FIG. 7.

Although in the present embodiment, a case is explained in which the acquirer 203 acquires, as the dirt information JD, the maximum value of power that is consumed by the work unit driving motor 142 when the mower 2 is in execution of the mowing work, embodiments of the present invention are not limited to this. The acquirer 203 may acquire, as the dirt information JD, an average value of power that is consumed by the work unit driving motor 142 during a predetermined period before the mower 2 ends the mowing work. The predetermined period is, for example, 1 hour. Furthermore, the acquirer 203 may acquire, as the dirt information JD, a maximum value of a load voltage that is applied to the work unit driving motor 142 when the mower 2 is in execution of the mowing work, or a maximum value of a load current that flows to the work unit driving motor 142 when the mower 2 is in execution of the mowing work.

Furthermore, although in the present embodiment, a case is explained in which the acquirer 203 acquires, as the dirt information JD, the weather information when the mower 2 is in execution of the mowing work, embodiments of the present invention are not limited to this. The acquirer 203 may acquire, as the dirt information JD, the temperature information or the humidity information when the mower 2 is in execution of the mowing work. For example, as the temperature in the mowing area AR becomes higher, it becomes easier for moisture of pieces of grass that is mowed by the cutting blade disc 141 to dry and more difficult for the pieces to adhere to the mower main body 2A. Accordingly, the temperature can be used as the dirt information JD. Furthermore, for example, as the humidity in the mowing area AR becomes higher, it becomes more difficult for moisture of pieces of grass that is mowed by the cutting blade disc 141 to dry and easier for the pieces to adhere to the mower main body 2A. Accordingly, the humidity can be used as the dirt information JD.

[2-3. Method Determination Processing of First Controller]

FIG. 9 is a flowchart showing one example of the method determination processing of the first controller 20.

First, as shown in FIG. 9, in step S401, the determiner 204 determines whether a degree of dirt of the mower 2 is equal to or greater than a second dirt threshold. The second dirt threshold indicates a threshold of the degree of dirt that serves as a criterion for determining the necessity of washing. The second dirt threshold is greater than the first dirt threshold, which is, for example, 4.

When the determiner 204 determines that the degree of dirt of the mower 2 is equal to or greater than the second dirt threshold (YES in step S401), the processing proceeds to step S413. When the determiner 204 determines that the degree of dirt of the mower 2 is not equal to or greater than the second dirt threshold (NO in step S401), the processing proceeds to step S403.

In step S403, the determiner 204 determines whether the first power value is equal to or greater than a third power threshold. The third power threshold indicates a threshold of the first power value that serves as a criterion for determining the necessity of washing. It should be noted that the third power threshold is greater than the first power threshold.

When the determiner 204 determines that the first power value is equal to or greater than the third power threshold (YES in step S403), the processing proceeds to step S413. When the determiner 204 determines that the first power value is not equal to or greater than the third power threshold (NO in step S403), the processing proceeds to step S405.

In step S405, the determiner 204 determines whether the second power value is equal to or greater than a fourth power threshold. The fourth power threshold indicates a threshold of the second power value that serves as a criterion for determining the necessity of washing. It should be noted that the fourth power threshold is greater than the second power threshold.

When the determiner 204 determines that the second power value is equal to or greater than the fourth power threshold (YES in step S405), the processing proceeds to step S413. When the determiner 204 determines that the second power value is not equal to or greater than the fourth power threshold (NO in step S405), the processing proceeds to step S407.

In step S407, the determiner 204 determines whether a maximum value of the slip ratio λ is equal to or greater than a second slip threshold. The second slip threshold indicates the maximum value of the slip ratio λ that serves as a criterion for determining the necessity of washing. The second slip threshold is greater than the first slip threshold.

When the determiner 204 determines that the maximum value of the slip ratio λ is equal to or greater than the second slip threshold (YES in step S407), the processing proceeds to step S413. When the determiner 204 determines that the maximum value of the slip ratio λ is not equal to or greater than the second slip threshold (NO in step S407), the processing proceeds to step S409.

In step S409, the determiner 204 determines whether the weather in the mowing area AR is rainy when the mower 2 is in execution of the mowing work.

When the determiner 204 determines that the weather in the mowing area AR is rainy (YES in step S409), the processing proceeds to step S413. When the determiner 204 determines that the weather in the mowing area AR is not rainy (NO in step S409), the processing proceeds to step S411.

In step S411, the determiner 204 determines whether the water sprinkling operation is executed by the sprinkler 4 for equal to or greater than a second water-sprinkling time when the mower 2 is in execution of the mowing work. In other words, the determiner 204 determines whether the operation time WS is equal to or greater than the second water-sprinkling time. The second water-sprinkling time is longer than the first water-sprinkling time, which is, for example, 60 minutes.

When the determiner 204 determines that the water sprinkling operation is executed by the sprinkler 4 for equal to or greater than the second water-sprinkling time (YES in step S411), the processing proceeds to step S413.

In step S413, the determiner 204 determines that the method of cleaning is washing, and the processing returns to step S219 in FIG. 7.

When the determiner 204 determines that the water sprinkling operation is not executed by the sprinkler 4 for equal to or greater than the second time (NO in step S411), the processing proceeds to step S415.

In step S415, the determiner 204 determines that the method of cleaning is air blowing, and the processing returns to step S219 in FIG. 7.

Although in the present embodiment, a case is explained in which two methods of cleaning are provided: washing and air blowing, embodiments of the present invention are not limited to this. There may be provided three or more methods of cleaning. For example, there are a plurality of methods for air blowing when pressure of compressed air that is discharged from the air blowing mechanism 38 can be changed in air blowing. In other words, the plurality of methods of air blowing are, for example, a method of executing air blowing having a high pressure and a method of executing air blowing having a low pressure.

Furthermore, although in the present embodiment, a case is explained in which the determiner 204 determines the method of cleaning, based on power that is consumed by the work unit driving motor 142 when the mower 2 is in execution of the mowing work, embodiments of the present invention are not limited to this. The determiner 204 may determine the method of cleaning, based on, when the mower 2 is in execution of the mowing work, a load voltage that is applied to the work unit driving motor 142 or a load current that flows to the work unit driving motor 142.

Furthermore, although in the present embodiment, a case is explained in which the determiner 204, when the mower 2 moves to the cleaning station 3, determines the method of cleaning, based on power that is consumed by the traveling motor 15, embodiments of the present invention are not limited to this. The determiner 204, when the mower 2 moves to the cleaning station 3, may determine the method of cleaning, based on a load voltage that is applied to the traveling motor 15 or a load current that flows to the traveling motor 15.

Furthermore, although in the present embodiment, the determiner 204 does not determine the method of cleaning using the work frequency WN, the work time WH, and the travel distance WL, embodiments of the present invention are not limited to this. The determiner 204 may determine the method of cleaning using at least one of the work frequency WN, the work time WH, and the travel distance WL during work.

[2-4. Cleaning Execution Processing of First Controller]

FIG. 10 is a flowchart showing one example of the cleaning execution processing of the first controller 20.

First, in step S501, the first cleaning executor 205 determines, according to the determination result of the determiner 204, whether washing of the mower 2 is to be executed.

When the first cleaning executor 205 determines that washing of the mower 2 is not to be executed (NO in step S501), the processing proceeds to step S551. When the first cleaning executor 205 determines that washing of the mower 2 is to be executed (YES in step S501), the processing proceeds to step S503.

In step S503, the first cleaning executor 205 instructs, via the first communicator 25 and the second communicator 312, the second cleaning executor 311D to start water supply. The second cleaning executor 311D, according to the instruction that is issued by the first cleaning executor 205, causes the electric valve 36 to be in an opened state and starts water supply.

Next, in step S505, the first cleaning executor 205 determines whether a first time T1 elapses. The first time T1 is set to be longer than a time from when the electric valve 36 is caused to be in an opened state to when the tap water reaches the opening QP of the spreading member 144 via the water receiver 21 and the first flow path 22. The first time T1 is, for example, 1 minute.

When the first cleaning executor 205 determines that the first time T1 does not elapse (NO in step S505), the processing enters a standby state. When the first cleaning executor 205 determines that the first time T1 elapses (YES in step S505), the processing proceeds to step S507.

In step S507, the first cleaning executor 205 causes the lifting and lowering mechanism 16 to lower the cutting blade disc 141.

Next, in step S509, the first cleaning executor 205 causes the work unit driving motor 142 to start rotation of the cutting blade disc 141.

Next, in step S511, the first cleaning executor 205 causes the traveling motor 15 to start traveling of the mower 2 such that the cleaning target portion of the mower main body 2A slides on the sliding member 35 that is disposed on the cleaning station 3.

Next, in step S513, the first cleaning executor 205 determines whether a second time T2 elapses. The second time T2 indicates a time from when washing of the mower main body 2A starts to when the washing of the mower main body 2A ends. The second time T2 is set based on, for example, the degree of dirt that is obtained by the determiner 204 from the dirt image. The second time T2 is, for example, 10 minutes.

When the first cleaning executor 205 determines that the second time T2 does not elapse (NO in step S513), the processing enters a standby state. When the first cleaning executor 205 determines that the second time T2 elapses (YES in step S513), the processing proceeds to step S515.

In step S515, the first cleaning executor 205 stops the traveling of the mower 2 that is driven by the traveling motor 15.

Next, in step S517, the first cleaning executor 205 causes the work unit driving motor 142 to stop the rotation of the cutting blade disc 141.

Next, in step S519, the first cleaning executor 205 causes the lifting and lowering mechanism 16 to lift the cutting blade disc 141.

Next, in step S521, the first cleaning executor 205 instructs, via the first communicator 25 and the second communicator 312, the second cleaning executor 311D to stop the water supply. The second cleaning executor 311D, according to the instruction that is issued by the first cleaning executor 205, causes the electric valve 36 to be in a closed state and stops the water supply. Thereafter, the processing ends.

When it is determined to be NO in step S501, in step S551, the first cleaning executor 205 instructs, via the first communicator 25 and the second communicator 312, the second cleaning executor 311D to cause the air blowing mechanism 38 to discharge compressed air. The second cleaning executor 311D, according to the instruction that is issued by the first cleaning executor 205, causes the air blowing mechanism 38 to discharge compressed air.

Next, in step S553, the first cleaning executor 205 causes the lifting and lowering mechanism 16 to lower the cutting blade disc 141.

Next, in step S555, the first cleaning executor 205 causes the traveling motor 15 to start traveling of the mower 2 such that the cleaning target portion of the mower main body 2A slides on the sliding member 35 that is disposed on the cleaning station 3.

Next, in step S557, the first cleaning executor 205 determines whether a third time T3 elapses. The third time T3 indicates a time from when air blowing starts to when the air blowing ends. The third time T3 is set based on, for example, the degree of dirt that is obtained by the determiner 204 from the dirt image. The third time T3 is, for example, 5 minutes.

When the first cleaning executor 205 determines that the third time T3 does not elapse (NO in step S557), the processing enters a standby state. When the first cleaning executor 205 determines that the third time T3 elapses (YES in step S557), the processing proceeds to step S559.

In step S559, the first cleaning executor 205 stops the traveling of the mower 2 that is driven by the traveling motor 15.

Next, in step S561, the first cleaning executor 205 causes the lifting and lowering mechanism 16 to lift the cutting blade disc 141.

Next, in step S563, the first cleaning executor 205 instructs, via the first communicator 25 and the second communicator 312, the second cleaning executor 311D to cause the air blowing mechanism 38 to stop discharging compressed air. The second cleaning executor 311D, according to the instruction that is issued by the first cleaning executor 205, causes the air blowing mechanism 38 to stop discharging compressed air. Thereafter, the processing ends.

3. Effect of the Present Embodiment

As explained above, in the present embodiment, there is provided the cleaning system 100 including: the mower 2 that executes the mowing work while traveling autonomously; and the cleaning station 3 that cleans the mower 2, and the cleaning system 100 includes: the acquirer 203 that acquires the dirt information JD relating to a state of dirt of the mower 2; the determiner 204 that determines at least one of the necessity of cleaning the mower 2 and the method of cleaning the mower 2, based on the dirt information JD; and the first cleaning executor 205 that executes the cleaning operation, according to the determination result of the determiner 204.

Accordingly, at least one of the necessity of cleaning the mower 2 and the method of cleaning the mower 2 is determined based on the dirt information JD relating to a state of dirt of the mower 2, and thus it is possible to determine at least one of the necessity of cleaning and the method of cleaning, according to a state of dirt of the mower 2.

Furthermore, the acquirer 203 acquires, as the dirt information JD, the work history of the mower 2, and the work history includes the work frequency WN, the work time WH, and the travel distance WL during work.

Accordingly, the acquirer 203 acquires, as the dirt information JD, the work history including at least one of the work frequency WN, the work time WH, and the travel distance WL during work and thus can acquire the dirt information JD that is appropriate. In other words, it can be estimated that as each of the work frequency WN, the work time WH, and the travel distance WL increases, the degree of dirt of the mower 2 becomes worse. In other words, the degree of dirt of the mower 2 can be estimated from each of the work frequency WN, the work time WH, and the travel distance WL. Accordingly, at least one of the necessity of cleaning and the method of cleaning can be determined appropriately.

Furthermore, the cleaning system 100 includes the detector 202 that detects dirt of the mower 2, and the acquirer 203 acquires, as the dirt information JD, information indicating the dirt that is detected by the detector 202.

Accordingly, the acquirer 203 acquires, as the dirt information JD, the information indicating the dirt that is detected by the detector 202 and thus can acquire the dirt information JD that is appropriate. Accordingly, at least one of the necessity of cleaning and the method of cleaning can be determined appropriately.

Furthermore, the detector 202 generates a dirt image indicating dirt of the mower 2, and the acquirer 203 acquires the dirt image as the dirt information.

Accordingly, the acquirer 203 acquires, as the dirt information, the dirt image indicating dirt of the mower 2 and thus can acquire the dirt information JD that is appropriate. Accordingly, at least one of the necessity of cleaning and the method of cleaning can be determined appropriately.

Furthermore, the mower 2 includes the first imaging device 19 as part of the detector 202, the cleaning station 3 includes the second imaging device 37 as part of the detector 202, and each of the first imaging device 19 and the second imaging device 37 generates a dirt image.

Accordingly, there is provided the first imaging device 19 and the second imaging device 37 that each generate the dirt image, it is possible to easily acquire the dirt information JD that is appropriate. Accordingly, at least one of the necessity of cleaning and the method of cleaning can be determined appropriately.

Furthermore, in the mower 2, the work unit 14 that executes the mowing work is driven by the work unit driving motor 142, and the acquirer 203 acquires, as the dirt information JD, a value of at least one of the power consumption, the load voltage, and the load current of the work unit driving motor 142.

Accordingly, the value of at least one of the power consumption, the load voltage, and the load current of the work unit driving motor 142 is acquired as the dirt information JD, and thus it is possible to acquire the dirt information JD that is appropriate. In other words, it can be estimated that as the degree of dirt around the work unit 14 of the mower 2 becomes worse, each of the power consumption, the load voltage, and the load current of the work unit driving motor 142 increases. In other words, the degree of dirt around the work unit 14 of the mower 2 can be estimated from each of the power consumption, the load voltage, and the load current of the work unit driving motor 142. Accordingly, at least one of the necessity of cleaning and the method of cleaning can be determined appropriately.

Furthermore, traveling of the mower 2 is driven by the rear wheel 13, the rear wheel 13 is driven by the traveling motor 15, and the acquirer 203 acquires, as the dirt information JD, a value of at least one of the power consumption, the load voltage, and the load current of the traveling motor 15.

Accordingly, the value of at least one of the power consumption, the load voltage, and the load current of the traveling motor 15 is acquired as the dirt information JD, and thus it is possible to acquire the dirt information JD that is appropriate. In other words, it can be estimated that as the degree of dirt of the rear wheel 13 of the mower 2 becomes worse, each of the power consumption, the load voltage, and the load current of the traveling motor 15 increases. In other words, the degree of dirt of the rear wheel 13 of the mower 2 can be estimated from each of the power consumption, the load voltage, and the load current of the traveling motor 15. Accordingly, at least one of the necessity of cleaning and the method of cleaning can be determined appropriately.

Furthermore, the acquirer 203 acquires, as the dirt information JD, a value of at least one of the power consumption, the load voltage, and the load current of the traveling motor 15 when the mower 2 moves to the cleaning station 3.

Accordingly, the mower 2 acquires, as the dirt information JD, the value of at least one of the power consumption, the load voltage, and the load current of the traveling motor 15 when the mower 2 moves to the cleaning station 3, and thus it is possible to acquire the dirt information JD that is appropriate. In other words, it can be estimated that as the degree of dirt of the rear wheel 13 of the mower 2 becomes worse, each of the power consumption, the load voltage, and the load current of the traveling motor 15 when the mower 2 moves to the cleaning station 3 increases. In other words, the degree of dirt of the rear wheel 13 of the mower 2 can be estimated from each of the power consumption, the load voltage, and the load current of the traveling motor 15 when the mower 2 moves to the cleaning station 3. Accordingly, at least one of the necessity of cleaning and the method of cleaning can be determined appropriately.

Furthermore, traveling of the mower 2 is driven by the rear wheel 13, and the acquirer 203 acquires, as the dirt information JD, the slip ratio $\lambda$ of the rear wheel 13.

Accordingly, the acquirer 203 acquires, as the dirt information JD, the slip ratio $\lambda$ of the rear wheel 13 that is a driving wheel, and thus it is possible to acquire the dirt information JD that is appropriate. In other words, it can be estimated that as the degree of dirt of the rear wheel 13 of the mower 2 becomes worse, the slip ratio $\lambda$ of the rear wheel 13 increases. In other words, the degree of dirt of the rear wheel 13 of the mower 2 can be estimated from the slip ratio $\lambda$ of the rear wheel 13. Accordingly, at least one of the necessity of cleaning and the method of cleaning can be determined appropriately.

Furthermore, the acquirer 203 acquires, as the dirt information JD, the slip ratio $\lambda$ when the mower 2 moves to the cleaning station 3.

Accordingly, the acquirer 203 acquires, as the dirt information JD, the slip ratio $\lambda$ when the mower 2 moves to the cleaning station 3, and thus it is possible to acquire the dirt information JD that is appropriate. In other words, it can be estimated that as the degree of dirt of the rear wheel 13 of the mower 2 becomes worse, the slip ratio λ of the rear wheel 13 when the mower 2 moves to the cleaning station 3 increases. In other words, the degree of dirt of the rear wheel 13 of the mower 2 can be estimated from the slip ratio λ of the rear wheel 13 when the mower 2 moves to the cleaning station 3. Accordingly, at least one of the necessity of cleaning and the method of cleaning can be determined appropriately.

Furthermore, the acquirer 203 acquires, as the dirt information JD, at least one of the weather, the temperature, and the humidity when the mower 2 executes the mowing work.

Accordingly, the acquirer 203 acquires, as the dirt information JD, at least one of the weather, the temperature, and the humidity when the mower 2 executes the mowing work, and thus it is possible to acquire the dirt information JD that is appropriate. In other words, for example, when the weather is rainy, moisture adheres to the lawn, and pieces of grass that is mowed by the cutting blade disc 141 are likely to adhere to the mower main body 2A via water. Accordingly, the degree of dirt of the mower 2 becomes worse than in a case where the weather is sunny or cloudy. Furthermore, for example, as the temperature in the mowing area AR becomes higher, it becomes easier for moisture of pieces of grass that is mowed by the cutting blade disc 141 to dry and more difficult for the pieces to adhere to the mower main body 2A. Furthermore, as the humidity in the mowing area AR becomes higher, it becomes more difficult for moisture of pieces of grass that is mowed by the cutting blade disc 141 to dry and easier for the pieces to adhere to the mower main body 2A. In other words, the degree of dirt of the mower 2 can be estimated from the weather, the temperature, and the humidity when the mower 2 executes the mowing work. Accordingly, at least one of the necessity of cleaning and the method of cleaning can be determined appropriately.

Furthermore, when the mower 2 executes the mowing work, the acquirer 203 acquires, as the dirt information JD, work information of the work device that affects dirt of the mower 2, such as the sprinkler 4.

Accordingly, when the mower 2 executes the mowing work, the acquirer 203 acquires, as the dirt information JD, the work information of the work device that affects dirt of the mower 2, such as the sprinkler 4. In other words, for example, when the sprinkler 4 spreads water on the lawn in the mowing area AR, pieces of grass that is mowed by the cutting blade disc 141 are more likely to adhere to the mower main body 2A via water than in a case where the sprinkler 4 does not spread water on the lawn in the mowing area AR. In other words, the degree of dirt of the mower 2 can be estimated from the work information of a work machine such as the sprinkler 4. Accordingly, at least one of the necessity of cleaning and the method of cleaning can be determined appropriately.

Furthermore, the autonomous traveling work machine is the mower 2 that executes the mowing work for mowing the lawn growing in the mowing area AR, and the work device is the sprinkler 4 that is disposed in the mowing area AR and spreads water on the lawn.

Accordingly, when the mower 2 executes the mowing work, the acquirer 203 acquires, as the dirt information JD, the work information of the work device that affects dirt of the mower 2, such as the sprinkler 4. In other words, when the sprinkler 4 spreads water on the lawn in the mowing area AR, pieces of grass that is mowed by the cutting blade disc 141 are more likely to adhere to the mower main body 2A via water than in a case where the sprinkler 4 does not spread water on the lawn in the mowing area AR. In other words, the degree of dirt of the mower 2 can be estimated from the work information of the sprinkler 4. Accordingly, at least one of the necessity of cleaning and the method of cleaning can be determined appropriately.

In the present embodiment, there is provided a method of controlling the cleaning system 100 including: the mower 2 that executes the mowing work while traveling autonomously; and the cleaning station 3 that cleans the mower 2, and the method of controlling the cleaning system 100 acquires the dirt information JD relating a state of dirt of the mower 2; determines at least one of the necessity of cleaning the mower 2 and the method of cleaning the mower 2, based on the dirt information JD; and executes the cleaning operation, according to a result of the determination.

Accordingly, at least one of the necessity of cleaning the mower 2 and the method of cleaning the mower 2 is determined based on the dirt information JD relating to a state of dirt of the mower 2, and thus it is possible to determine at least one of the necessity of cleaning and the method of cleaning, according to the state of dirt of the mower 2.

4. Other Embodiments

The present invention is not limited to the configuration of the above embodiment and may be implemented in various aspects without departing from the gist of the present invention.

For example, although in the present embodiment, the "autonomous traveling work machine" is the robotic mower 2, embodiments of the present invention are not limited to this. The "autonomous traveling work machine" may execute the predetermined work while traveling autonomously. For example, the "autonomous traveling work machine" may be a robotic snow removal machine that performs a snow removal work while traveling autonomously.

Furthermore, although in the present embodiment, the detector 202, the acquirer 203, the determiner 204, and the first cleaning executor 205 are disposed on the mower 2, embodiments of the present invention are not limited to this. At least one of the detector 202, the acquirer 203, the determiner 204, and the first cleaning executor 205 may be disposed on the cleaning station 3.

Furthermore, although in the present embodiment, the detector 202 generates the information indicating a dirt image via the first imaging device 19 and the second imaging device 37, embodiments of the present invention are not limited to this. The detector 202 may detect dirt of the mower main body 2A. For example, the mower 2 may include a light projector and a light receiver, and the detector 202 may detect dirt of the mower main body 2A, based on a light amount that is detected by the light receiver. For example, the light projector and the light receiver, when detecting dirt, project downward from the bottom surface 111 of the housing 11 of the mower main body 2A. The light projector is disposed on a front end portion of the mower main body 2A, and the light receiver is disposed on a rear end portion of the mower main body 2A.

Furthermore, although in the present embodiment, the mower 2 includes the first imaging device 19, and the cleaning station 3 includes the second imaging device 37, embodiments of the present invention are not limited to this. At least one of the mower 2 and the cleaning station 3 may include an imaging device.

Furthermore, although in the present embodiment, the first imaging device 19 generates a dirt image indicating dirt of the mower 2 via the reflection mirror that is disposed on the cleaning station 3, embodiments of the present invention are not limited to this. The cleaning system 100 may include a plurality of mowers 2, and the first imaging device 19 that is disposed on one mower 2 may generate a dirt image indicating dirt of the other mower 2. In this case, the acquirer 203 of the other mower 2 may acquire the dirt image from one mower 2 via wireless communication. Furthermore, the acquirer 203 of the other mower 2 may acquire the dirt image from one mower 2 via the server device 400.

Furthermore, although in the present embodiment, a "washing liquid" is the tap water, embodiments of the present invention are not limited to this. The "washing liquid" may be water, such as tap water, to which detergent is added.

Furthermore, although in the present embodiment, the water receiver 21 receives the tap water that flows down from the outflow opening 323 of the water supplier 32, embodiments of the present invention are not limited to this. The water supplier 32 and the water receiver 21 may be engaged with each other so that the water supplier 32 supplies the water receiver 21 with the tap water. For example, the water supplier 32 includes a recessed member, and the water receiver 21 includes a raised member that engages with the recessed member. The raised member engages with the recessed member, and thereby the water supplier 32 supplies the water receiver 21 with the tap water.

Furthermore, for example, the placement base 33 of the cleaning station 3 may include a nozzle that jets high-pressure water, and the first controller 20, such that the high-pressure water is jetted toward the cleaning target portion of the mower main body 2A, may cause the traveling motor 15 to drive the mower main body 2A to travel.

Furthermore, although in the present embodiment, the cleaning station 3 and the mower 2 communicate with each other in a wireless manner, the present invention is not limited to this. It is sufficient that the cleaning station 3 and the mower 2 can communicate with each other. For example, the cleaning station 3 and the mower 2 may communicate with each other in a wired manner. Specifically, a communication line may be disposed which communicably connects the control board 31 and the first controller 20, and via the communication line, the control board 31 and the first controller 20 may communicate with each other. Furthermore, for example, the control board 31 and the first controller 20 may execute so-called power line communication via a power line.

Furthermore, at least part of the functional blocks shown in the drawings such as FIGS. 2, 3, and 5 may be implemented by hardware or may be implemented by cooperation of hardware and software, which is not limited to a configuration in which hardware resources are disposed independently as shown in the drawings.

Furthermore, the control program that is executed by the first controller 20 may be stored in the other storage in the memory. Furthermore, a configuration may be provided in which a control program that is stored in an external device is acquired via a communicator or the like and is executed.

Furthermore, the processing of the first controller 20, for facilitation of the understanding, is divided into the processing units in the respective flowcharts shown in FIGS. 6 to 10, according to the main processing contents. The embodiment is not limited by a way of the division into the processing units in the respective flowcharts shown in FIGS. 6 to 10, and names of the processing units. Furthermore, the processing of the first controller 20 may be divided into still more processing units, according to the processing contents, and one processing unit may be divided so as to include still more processing. Furthermore, processing procedures of the above flowcharts are also not limited to the illustrated examples.

REFERENCE SIGNS LIST

1: mowing system
2: robotic mower, mower (autonomous traveling work machine)
3: cleaning station
4: sprinkler (work device)
$\lambda$: slip ratio
11: housing
12: front wheel
13: rear wheel
14: work unit
15: traveling motor (second motor)
16: lifting and lowering mechanism
17: battery
18: vehicle speed sensor
19: first imaging device (imaging unit)
20: first controller
21: water receiver
22: first flow path
25: first communicator
26: charger
2A: mower main body
30: arch member
31: control board
32: water supplier
33: placement base
34: power supplier
35: sliding member
36: electric valve
37: second imaging device (imaging unit)
38: air blowing mechanism
100: washing system
111: bottom surface
141: cutting blade disc
142: work unit driving motor (first motor)
144: spreading member
18A: driving wheel vehicle speed sensor
18B: driven wheel vehicle speed sensor
201: first transceiver
202: detector
203: acquirer
204: determiner
205: first cleaning executor (cleaning executor)
206: history storage
211: upper surface opening
311: second controller
312: second communicator
321: inflow opening
322: second flow path
323: outflow opening
400: server device
311A: second processor
311B: second memory
311C: second transceiver
311D: second cleaning executor
DF: front direction
DR: rear direction
JD: dirt information
QP: opening
VD: driving wheel vehicle speed
VN: driven wheel vehicle speed
WH: work time WN: work frequency
WL: travel distance
S11: first power sensor
S12: first voltage sensor
S13: first current sensor
S21: second power sensor
S22: second voltage sensor
S23: second current sensor

What is claimed is:

1. A cleaning system comprising: an autonomous traveling work machine executing a predetermined work while traveling autonomously; and a cleaning station cleaning the autonomous traveling work machine, wherein
the autonomous traveling work machine comprises: a processor configured to control an operation of the autonomous traveling work machine; a motor for driving a work unit that executes the predetermined work; and a sensor that detects a value of at least one of a power consumption, a load voltage, and a load current of the motor,
wherein the processor:
acquires the value of at least one of the power consumption, the load voltage, and the load current as dirt information relating to a state of dirt of the autonomous traveling work machine;
determines at least one of a necessity of cleaning the autonomous traveling work machine and a method of cleaning the autonomous traveling work machine, based on whether or not a maximum value of the value of the at least one of the power consumption, the load voltage, and the load current during execution of the predetermined work is equal to or greater than a predetermined threshold value; and
executes a cleaning operation, according to the determination result of the at least one of the necessity of cleaning the autonomous traveling work machine and the method of cleaning the autonomous traveling work machine.

2. A cleaning system comprising: an autonomous traveling work machine executing a predetermined work while traveling autonomously; and a cleaning station cleaning the autonomous traveling work machine, wherein
the autonomous traveling work machine comprises: a processor configured to control an operation of the autonomous traveling work machine; a motor for driving a driving wheel to travel the autonomous traveling work machine, and a sensor that detects a value of at least one of a power consumption, a load voltage, and a load current of the motor,
wherein the processor:
acquires the value of at least one of the power consumption, the load voltage, and the load current as the dirt information relating to a state of dirt of the autonomous traveling work machine;
determines at least one of a necessity of cleaning the autonomous traveling work machine and a method of cleaning the autonomous traveling work machine, based on whether or not a maximum value of the value of the at least one of the power consumption, the load voltage, and the load current when the autonomous traveling work machine enters the cleaning station is equal to or greater than a predetermined threshold value; and
executes a cleaning operation, according to the determination result of the at least one of the necessity of cleaning the autonomous traveling work machine and the method of cleaning the autonomous traveling work machine.

3. A cleaning system comprising: an autonomous traveling work machine executing a predetermined work while traveling autonomously; and a cleaning station cleaning the autonomous traveling work machine, wherein
the autonomous traveling work machine comprises a processor configured to control an operation of the autonomous traveling work machine, and is driven to travel by a driving wheel,
the processor:
acquires a driving wheel vehicle speed corresponding to a peripheral speed of a driving wheel and a driven wheel vehicle speed corresponding to a peripheral speed of a driven wheel during a period from a time point when the autonomous traveling work machine starts entering the cleaning station to a time point when entering the cleaning station is completed,
calculates a slip ratio of the driving wheel by a following formula:

$$\lambda = (VD - VN)/VN \quad (1)$$

wherein $\lambda$ is the slip ratio, VD is the driving wheel vehicle speed, and VN is the driven wheel vehicle speed,
determines at least one of a necessity of cleaning the autonomous traveling work machine and a method of cleaning the autonomous traveling work machine, based on whether or not a maximum value of the calculated slip ratio is equal to or greater than a predetermined threshold value; and
executes a cleaning operation, according to a determination result of the at least one of the necessity of cleaning the autonomous traveling work machine and the method of cleaning the autonomous traveling work machine.

* * * * *